United States Patent [19]
Ohishi et al.

[11] Patent Number: 6,011,899
[45] Date of Patent: Jan. 4, 2000

[54] PACKET DATA SYSTEM RECORDING TIME STAMPS AND PACKET DATA ON TRACKS FORMED ON A STORAGE MEDIUM IN SYNCHRONISM WITH CHANGES IN TIME STAMP VALUES

[75] Inventors: Takeo Ohishi, Yokohama; Tsuyoshi Suzuki, Matsudo; Yasuaki Yamada, Yokohama; Tomoyuki Shindo, Yamato; Yutaka Tanaka, Yokosuka, all of Japan

[73] Assignee: Victor Company of Japan, Ltd., Yokohama, Japan

[21] Appl. No.: 08/748,643

[22] Filed: Nov. 13, 1996

[30] Foreign Application Priority Data

| Nov. 14, 1995 | [JP] | Japan | 7-295118 |
| Dec. 28, 1995 | [JP] | Japan | 7-343993 |
| Jan. 29, 1996 | [JP] | Japan | 8-012478 |

[51] Int. Cl.[7] .................. H04N 5/92; G11B 5/00
[52] U.S. Cl. .................. 386/98; 386/111; 386/124; 360/32; 360/48
[58] Field of Search ............... 386/68, 81, 82, 386/95, 45, 1, 124, 65, 111, 112, 125, 126, 98; 348/423; 360/20, 32, 48; H04N 5/92, 5/76, 5/78, 5/781

[56] References Cited

U.S. PATENT DOCUMENTS

| 5,467,342 | 11/1995 | Logston et al. | 370/17 |
| 5,521,927 | 5/1996 | Kim et al. | 348/423 |
| 5,566,174 | 10/1996 | Sato et al. | 348/423 |
| 5,576,902 | 11/1996 | Lane et al. | 386/68 |
| 5,596,581 | 1/1997 | Saeijs et al. | 386/104 |
| 5,790,543 | 8/1998 | Cloutier | 348/423 |
| 5,793,927 | 8/1998 | Lane | 386/81 |

*Primary Examiner*—Thai Tran
*Attorney, Agent, or Firm*—Lowe, Hauptman Gopstein Gilman & Berner

[57] ABSTRACT

A packet recording/reproducing system is provided which records or reproduces packets on or from tracks formed in time sequence on a magnetic tape. In a recording operation, the packet recording/reproducing system adds to input packets time stamps whose values are synchronous with packet arrival time control clocks produced by the system. The timing with which the packets are recorded on the magnetic tape is controlled by the arrival time control clocks so that a given number of the packets inputted at high data rate are recorded within a one-track area, a two-track area, or a one-track over area defined across at least two of the tracks, thereby minimizing the loss of capacity of the magnetic tape.

17 Claims, 20 Drawing Sheets

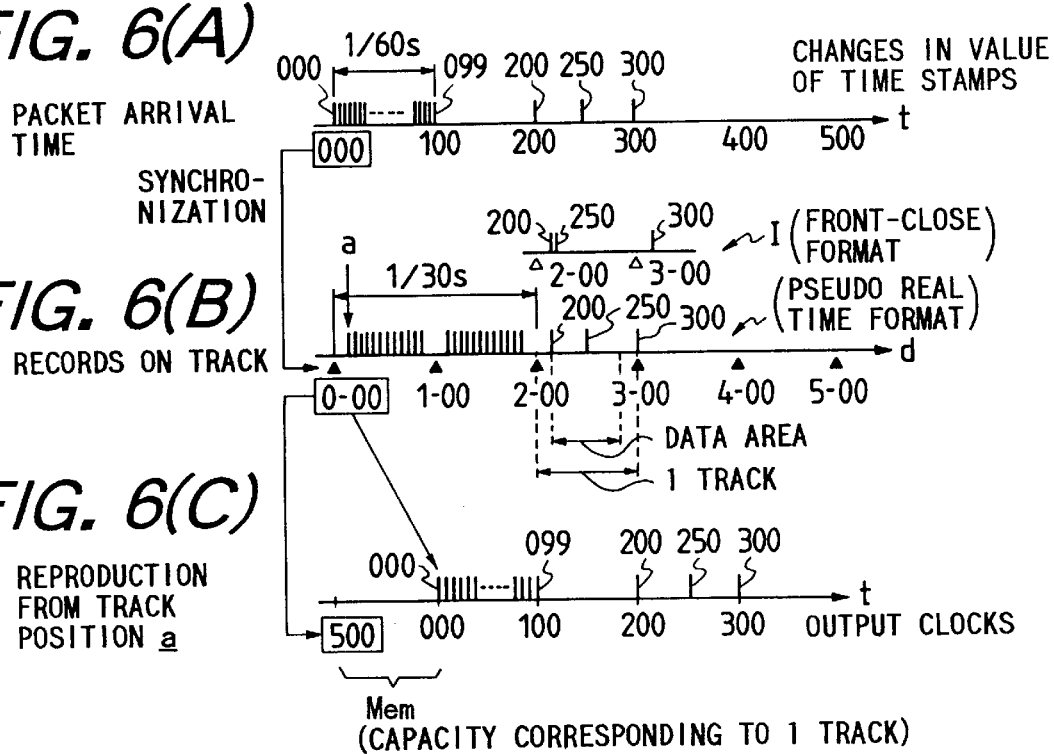
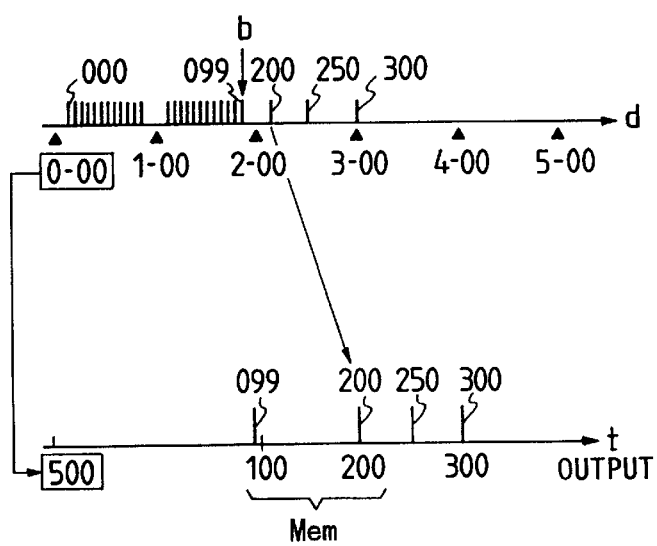

FIG. 13(A)

| PROGRAM 1 | PID05 |
| PROGRAM 2 | PID07 |
| PROGRAM 3 | PID09 |

FIG. 13(B)

PID=05
PMT OF
PROGRAM 1

| AUDIO 1 | PID10 |
| AUDIO 2 | PID11 |
| VIDEO | PID12 |
| PCR | PID15 |

FIG. 13(C)

PID=07
PMT OF
PROGRAM 2

| AUDIO 1 | PID20 |
| AUDIO 2 | PID21 |
| VIDEO | PID22 |
| PCR | PID25 |

FIG. 13(D)

PID=09
PMT OF
PROGRAM 3

| AUDIO 1 | PID30 |
| AUDIO 2 | PID31 |
| VIDEO | PID22 |
| PCR | PID15 |

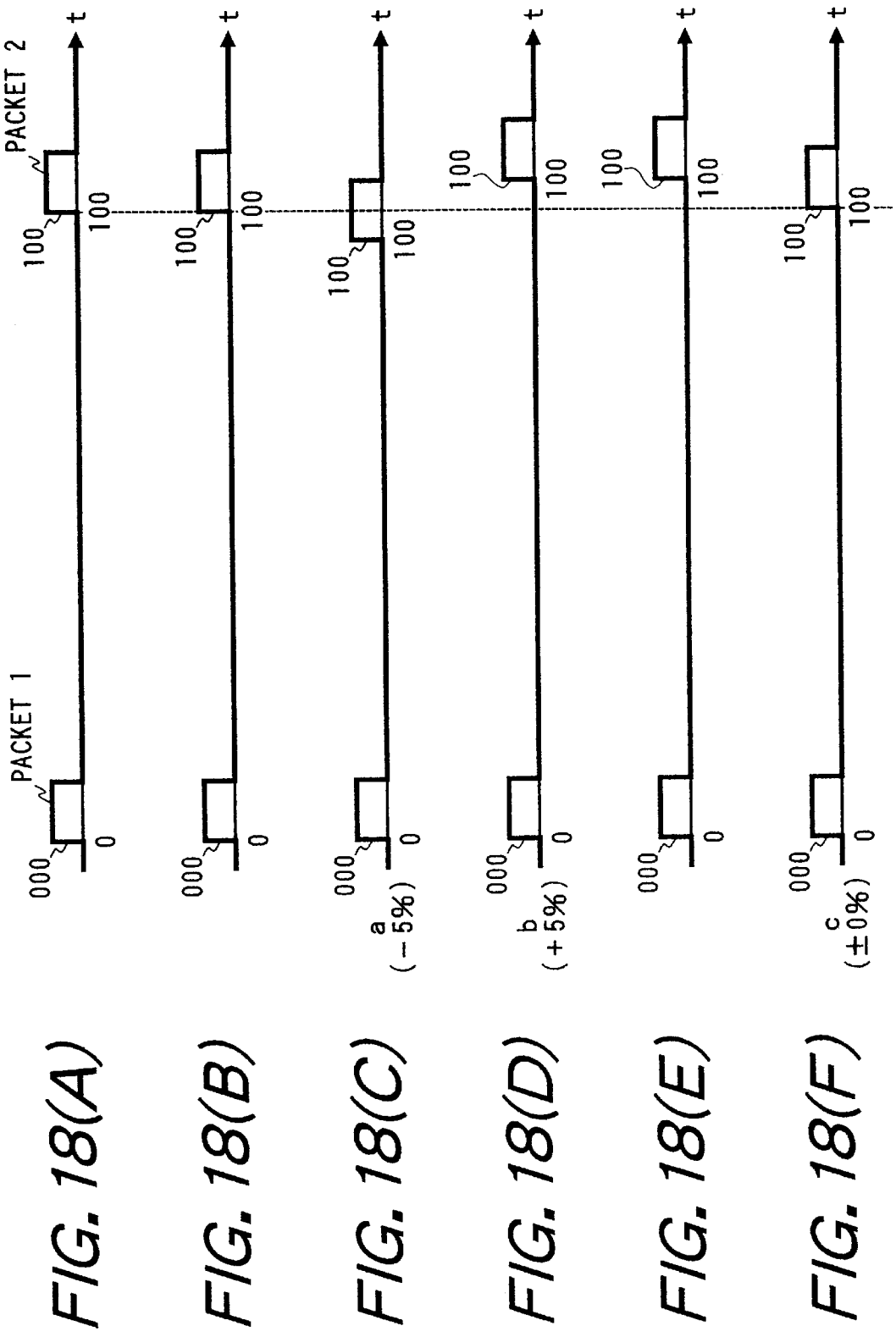

PACKET DATA SYSTEM RECORDING TIME STAMPS AND PACKET DATA ON TRACKS FORMED ON A STORAGE MEDIUM IN SYNCHRONISM WITH CHANGES IN TIME STAMP VALUES

BACKGROUND OF THE INVENTION

1. Technical Field

The present invention relates generally to an improved recording/reproducing system for recording or reproducing packet data on or from a storage medium and a storage medium on which the packet data is recorded in an unique format.

2. Background of Related Art

Nowadays, digital broadcasting as well as analog broadcasting is put to practical use with development of digital and integrated circuit techniques. In the digital broadcasting, a plurality of programs are transmitted in a time-division multiplexed mode using, for example, unique packets in a DSS (Digital Satellite System) which is in practical use in the United States or transport packets in the MPEG2 format for color moving picture coding in DVB (Digital Video Broadcasting) put to practical use in Europe. Specifically, a broadcasting station (i.e., an encoder) transmits packets of programs at time intervals avoiding overflow or underflow of a buffer memory of a receiver during reception of one of the packets. Therefore, recording a specified one of multiple programs of the digital broadcasting on a storage medium with bit streams requires correct reproduction of the contents of packets and packet intervals (generally called arrival intervals or arrival times).

When consecutive packets are recorded together in real time (e.g., when multiple programs transmitted without any loss of transmission capacity are all recorded by a recording device at a record rate of a similar capacity) or when intermittent packets are recorded, easy reproduction of the contents of packets and time intervals between arrivals of the packets is achieved by filling the time intervals with, for example, dummy data. Alternatively, in a recording device designed to record and reproduce data on and from a hard disc or a memory at higher speed and at random as compared with recording on a magnetic tape, the contents of packets and packet intervals may be recorded and reproduced in a simpler manner.

However, when a specific one of digital TV programs, that is, packets which have arrived intermittently are recorded on a magnetic tape with bit streams, it is necessary to take into account (1) reproduction of original time intervals between arrivals of the packets for reproducing the same signals as the recorded bit streams, (2) an instantaneous change in data rate caused by a variation in packet arriving during a unit time, (3) simplicity of a device such as a buffer memory, and (4) effective utilization of a recording capacity of a magnetic tape traveling continuously.

SUMMARY OF THE INVENTION

It is therefore a principal object of the present invention to avoid the disadvantages of the prior art.

According to the first aspect of the invention, there is provided a method of recording input packets on a storage medium comprising the steps of: (a) generating arrival time control clocks for the input packets: (b) producing time stamps having values which indicate times of arrivals of the input packets and which are changed in synchronism with the arrival time control clocks to add the time stamps to the packets, respectively; (c) forming tracks on the storage medium in time sequence in response to reference control signals provided in synchronism with the arrival time control clocks; and (d) recording the packets to which the time stamps are added on the storage medium in order of arrivals of the packets so that each of the packets is recorded within a given area *ranging from a reference position defined on one of the tracks corresponding to an arrival time of each of the packets to a given position away from the reference position at a preselected distance toward the following track.

According to the second aspect of the invention, there is provided a method of recording input packets on a storage medium comprising the steps of: (a) generating arrival time control clocks in synchronism with changes in value of time stamps for arrival time identification added to the input packets; (b) forming tracks on the storage medium in sequence in response to reference control signals provided in synchronism with the arrival time control clocks; and (c) recording the packets with the time stamps on the storage medium in order of arrivals of the packets so that each of the packets is recorded within a given area ranging from a reference position defined on one of the tracks corresponding to an arrival time of each of the packets to a given position away from the reference position at a preselected distance toward the following track.

According to the third aspect of the invention, there is provided a method of recording input packets on a storage medium comprising the steps of: (a) generating arrival time control clocks for the input packets; (b) producing time stamps having values which indicate times of arrivals of the input packets and which are changed in synchronism with the arrival time control clocks to add the time stamps to the packets, respectively; (c) forming tracks on the storage medium in sequence in response to reference control signals provided in synchronism with the arrival time control clocks; and (d) recording the packets to which the time stamps are added on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

According to the fourth aspect of the invention, there is provided a method of recording input packets on a storage medium comprising the steps of: (a) generating arrival time control clocks in synchronism with changes in value of time stamps for arrival time identification added to the input packets; (b) forming tracks on the storage medium in sequence in response to reference control signals provided in synchronism with the arrival time control clocks; and (c) recording the packets with the time stamps on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

According to the fifth aspect of the invention, there is provided a method of recording input packets on a storage medium comprising the steps of: (a) generating arrival time control clocks for the input packets; (b) producing time stamps having values which indicate times of arrivals of the input packets and which are changed in synchronism with the arrival time control clocks to add the time stamps to the packets, respectively; (c) forming tracks on the storage medium in time sequence in response to reference control signals provided in synchronism with the arrival time control clocks; and (d) recording the packets to which the time stamps are added on the storage medium in order of arrivals of the packets so as to shift toward a first one of the packets at least one of the packets following the first one of the packets within a given area ranging from a reference position defined on one of the tracks corresponding to an arrival time of the first one of the packets to a given position away from the reference position at a preselected distance toward the following tracks.

According to the sixth aspect of the invention, there is provided a method of recording input packets on a storage medium comprising the steps of: (a) generating arrival time control clocks in synchronism with changes in value of time stamps for arrival time identification added to the input packets; (b) forming tracks on the storage medium in sequence in response to reference control signals provided in synchronism with the arrival time control clocks; and (c) recording the packets to which the time stamps are added on the storage medium in order of arrivals of the packets so as to shift toward a first one of the packets at least one of the packets following the first one of the packets within a given area ranging from a reference position defined on one of the tracks corresponding to an arrival time of the first one of the packets to a given position away from the reference position at a preselected distance toward the following tracks.

According to the seventh aspect of the invention, there is provided a method of recording input packets on a storage medium comprising the steps of: (a) generating reference control signals in asynchronism with changes in value of time stamps for arrival time identification added to the packets; (b) forming tracks on the storage medium in time sequence in response to the reference control signals; and (c) recording the packets to which the time stamps are added on the storage medium in order of arrivals of the packets so that each of the packets is recorded within a given area ranging from a first position corresponding to an arrival time of each of the packets to a second position away from the first position at a preselected distance toward the following tracks.

According to the eighth aspect of the invention, there is provided a method of recording input packets on a storage medium comprising the steps of: (a) generating reference control signals in asynchronism with changes in value of time stamps for arrival time identification added to the packets; (b) forming tracks on the storage medium in time sequence in response to the reference control signals; and (c) recording the packets to which the time stamps are added on the storage medium in order of arrivals of the packets so that each of the packets is recorded within a given area ranging from a reference position defined on one of the tracks to a given position away from the reference position at a preselected distance toward the following tracks.

According to the ninth aspect of the invention, there is provided a method of recording input packets on a storage medium comprising the steps of: (a) generating reference control signals in asynchronism with changes in value of time stamps for arrival time identification added to the packets; (b) forming tracks on the storage medium in time sequence in response to the reference control signals; and (c) recording the packets to which the time stamps are added on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

According to the tenth aspect of the invention, there is provided a method of reproducing packets with time stamps for arrival time identification recorded on tracks formed in time sequence on a storage medium comprising the steps of: (a) reproducing the packets from the storage medium; (b) generating output time control clocks which correspond to positions of the tracks formed on the storage medium and which undergo delays of preselected time corresponding to a given area on the tracks formed in time sequence on the storage medium; and (c) outputting the packets with timing determined by the time stamps on a basis of the output time control clocks.

According to the eleventh aspect of the invention, there is provided a method of reproducing packets with time stamps for arrival time identification recorded on tracks formed in time sequence on a storage medium comprising the steps of: (a) reproducing the packets and the time stamps from the storage medium; (b) generating output time control clocks whose initial value is determined by one of the time stamps; and (c) outputting the packets at time intervals determined by the time stamps on a basis of the output time control clocks.

According to the twelfth aspect of the invention, there is provided a packet recording apparatus for recording packets on tracks formed in time sequence on a storage medium comprising: (a) a clock generating means for generating arrival time control clocks; (b) a time stamp producing means for producing time stamps in synchronism with the arrival time control clocks for identifying arrival times of the packets to add the time stamps to the packets, respectively; and (c) a recording means for recording the packets to which the time stamps are added on the storage medium in order of arrivals of the packets so that each of the packets is recorded within a given area ranging from a reference position defined on one of the tracks corresponding to an arrival time of each of the tracks to a given position away from the reference position at a preselected distance toward the following track.

According to the thirteenth aspect of the invention, there is provided a packet recording apparatus for recording packets on tracks formed in time sequence on a storage medium comprising: (a) a clock generating means for generating arrival time control clocks; (b) a time stamp producing means for producing time stamps in synchronism with the arrival time control clocks for identifying arrival times of the packets to add the time stamps to the packets, respectively; and (c) a recording means for recording the packets to which the time stamps are added on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

According to the fourteenth aspect of the invention, there is provided a packet recording apparatus for recording input packets on a storage medium comprising: (a) clock generating means for generating arrival time control clocks which are synchronous with values of time stamps added to the input packets; (b) recording means for recording tracks on the storage medium in time sequence to record the packets to which the time stamps are added on the storage medium in order of arrivals of the packets so that each of the packets is recorded within a given area ranging from a reference position defined on one of the tracks corresponding to an arrival time of each of the packets to a given position away from the reference position at a preselected distance toward the following track; and (c) a controlling means for controlling positions of the tracks formed on the storage medium in synchronism with the arrival time control clocks.

According to the fifteenth aspect of the invention, there is provided a packet recording apparatus for recording input packets on a storage medium comprising: (a) a clock generating means for generating arrival time control clocks which are synchronous with values of time stamps added to the input packets; (b) a recording means for recording tracks on the storage medium in time sequence to record the packets to which the time stamps are added on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively; and (c) a controlling means for controlling positions of the tracks formed on the storage medium in synchronism with the arrival time control clocks.

According to the sixteenth aspect of the invention, there is provided a packet reproducing apparatus comprising: (a) a reproducing means for reproducing tracks formed in time sequence on a storage medium to reproduce packets, to which time stamps for arrival time identification are added, recorded on the tracks; (b) a clock generating means for generating clocks having a given frequency; (e) a track control means for controlling positions where the tracks are reproduced by the reproducing means in synchronism with the clocks; (d) an output control clock generating means for generating output control clocks after a delay of given time from the clocks generated by the clock generating means, respectively; (e) a comparing means comparing a value changed in synchronism with the output control clocks with one of the time stamps to provide a signal when the value coincides with the one of the time stamps; and (f) an outputting means for outputting one of the packets to which the one of the time stamp is added.

According to the seventeenth aspect of the invention, there is provided a packet recording/reproducing apparatus comprising: (a) a recording means for recording tracks, in time sequence, on a first magnetic tape helically wrapped about a given area of a rotary drum using rotary heads disposed in the rotary drum to record input packets on the tracks in order of arrival of the input packets; (b) a reproducing means for reproducing tracks formed in time sequence on a second magnetic tape to reproduce packets recorded on the tracks of the second magnetic tape through the rotary heads of the rotary drum; (c) a clock generating means for generating arrival time control clocks; (d) a first speed control means for controlling the speed of the rotary drum so as to synchronize with the arrival time control clocks every six of tracks; (e) a time stamp producing means for producing time stamps in synchronism with the arrival time control clocks to add the time stamps to the packets to be recorded on the first magnetic tape, respectively; (f) a record controlling means for controlling the recording means so that each of the packets is recorded within a one-track area, a two-track area, or a one-track over area, the one-track area ranging from a reference position defined on one of the tracks corresponding to an arrival time of each of the tracks to a given position away from the reference position at a given interval toward the following track, the two-track area ranging from a first position to a second position which are defined away from the reference position at preselected distances toward the tracks preceding and following the one of the tracks, respectively, the one-track over area ranging from a record-starting position on the one of the tracks to a predetermined position away from the record-starting position at a preselected interval toward the following tracks; (g) a clock generating means for generating clocks having a given frequency; (h) a second speed control means for controlling the speeds of the rotary drum and the second magnetic tape at six-track intervals based on signals reproduced from the second magnetic tape and the clocks generated by the clock generating means; (i) an output control clock generating means for generating output control clocks after a delay of given time from the clocks generated by the clock generating means, respectively; (j) a comparing means comparing a value changed in synchronism with the output control clocks with one of the time stamps reproduced from the second magnetic tape to provide a signal when the value coincides with the one of the time stamps; (k) an outputting means for outputting one of the packets to which the one of the time stamp is added; and (l) a time stamp removing means for removing the time stamp from the one of the packets outputted from the outputting means.

According to the eighteenth aspect of the invention, there is provided a packet recording/reproducing apparatus comprising: (a) recording means for recording tracks, in time sequence, on a first magnetic tape helically wrapped about a given area of a rotary drum using rotary heads disposed in the rotary drum to record input packets on the tracks in order of arrival of the input packets; (b) a reproducing means for reproducing tracks formed in time sequence on a second magnetic tape to reproduce packets recorded on the tracks of the second magnetic tape through the rotary heads of the rotary drum; (c) a clock generating means for generating arrival time control clocks which are synchronous with values of time stamps added to the packets to be recorded on the first magnetic tape; (d) a first speed control means for controlling the speed of the rotary drum so as to synchronize with the arrival time control clocks every six of tracks; (e) a record controlling means for controlling the recording means so that each of the packets is recorded within a one-track area, a two-track area, or a one-track over area, the one-track area ranging from a reference position defined on one of the tracks corresponding to an arrival time of each of the packets to a given position away from the reference position at a given interval toward the following track, the two-track area ranging from a first position to a second position which are defined away from the reference position at preselected distances toward the tracks preceding and following the one of the tracks, respectively, the one-track over area ranging from a record-starting position on the one of the tracks to a predetermined position away from the record-starting position at a preselected interval toward the following tracks; (f) a clock generating means for generating clocks having a given frequency; (g) a second speed control means for controlling the speeds of the rotary drum and the second magnetic tape at six-track intervals based on signals reproduced from the second magnetic tape and the clocks generated by the clock generating means; (h) an output control clock generating means for generating output control clocks after a delay of given time from the clocks generated by the clock generating means, respectively; (i) a comparing means comparing a value changed in synchronism with the output control clocks with one of the time stamps reproduced from the second magnetic tape to provide a signal when the value coincides with the one of the time stamps; and (j) an outputting means for outputting one of the packets to which the one of the time stamp is added.

According to the nineteenth aspect of the invention, there is provided a storage medium on which tracks are formed in time sequence in synchronism with changes in value of time stamps for packet arrival time identification added to packets recorded on the storage medium, wherein each of the packets being recorded within a one-track area, a two-track area, or a one-track over area, the one-track area ranging from a reference position defined on one of the tracks corresponding to an arrival time of each of the packets to a given position away from the reference position at a given interval toward the following track, the two-track area ranging from a first position to a second position which are defined away from the reference position at preselected distances toward the tracks preceding and following the one of the tracks, respectively, the one-track over area ranging from a record-starting position on the one of the tracks to a predetermined position away from the record-starting position toward the following tracks at a preselected interval which is greater than a width of each of the tracks.

According to the twentieth aspect of the invention, there is provided a digital broadcasting receiver comprising: (a) a demodulating means for demodulating digital broadcasting signals including packets of information on a plurality of programs and time control packets each including time control information on one of the programs to provide demodulated signals; (b) a selecting means for selecting the packets of at least one of the programs from the demodulated signals from the demodulating means; (c) an identification information producing means for producing identification information serving to identify the time control packet from the packets selected by the selecting means, the identification information producing means outputting the identification information along with the packets selected by the selecting means; and (d) a decoding means for decoding the packets outputted from the identification information producing means based on the identification information.

According to the twenty first aspect of the invention, there is provided a packet recording apparatus for recording input digital signals multiplexing packets of information on at least one program, a time control packet including time control information on the program, and identification information serving to identify the time control packet, comprising: (a) an extracting means for extracting the time control information from the digital signals based on the identification information; (b) a clock generating means for generating clocks which are synchronous with input of the time control information extracted by the extracting means; (c) a reference control signal generating means for generating reference control signals in synchronism with the clocks generated by the clock generating means; and (d) a recording means for recording the digital signals on a storage medium in response to the reference control signals generated by the reference control signal generating means.

According to the twenty second aspect of the invention, there is provided a packet recording apparatus comprising: (a) an arrival time control clock generating means for generating arrival time control clocks in synchronism with input of a time reference value added to input packets; (b) an arrival time identification reference value generating means for generating arrival time identification reference values in synchronism with the arrival time control clocks generated by the arrival time control clock generating means; (c) a synchronization determining means for determining whether the arrival time control clocks are synchronous with the input of the time reference value or not, the synchronization determining means providing a first signal when the arrival time control clocks are synchronous with the input of the time reference value and a second signal when the arrival time control clocks are asynchronous with the input of the time reference value; (d) an adding means for adding the arrival time identification reference values to the input packets; (e) a switching means for switching between a first operation and a second operation, the first operation being provided in response to the first signal from the synchronization determining means to allow operations of the arrival time control clock generating means and the adding means, the second operation being provided in response to the second signal from the synchronization determining means to inhibit the operation of the arrival time control clock generating means; and (f) a recording means for recording the packets to which the arrival time identification reference values are added by the adding means on a storage medium.

In the preferred mode of the invention, the arrival time control clock generating means includes an extracting circuit which extracts the time reference value from the packets and a feedback loop comparing a count value provided by a counter based on the time reference value with the time reference value to determine a difference therebetween to control a frequency of oscillations provided by an oscillator according to the difference to output the oscillations as the arrival time control clocks and to feedback the oscillations to the counter as being used as the time reference value in following cycles. The synchronization determining means includes an averaging circuit which averages the differences derived by arrival time control clock generating means for given number of cycles and a comparing circuit which compares an output signal from the averaging means with a given reference value to provide the first and second signals based on a result of the comparison.

According to the twenty third aspect of the invention, there is provided a packet recording apparatus comprising: (a) an arrival time control clock generating means for generating arrival time control clocks in synchronism with input of a time reference value added to input packets; (b) an arrival time identification reference value generating means for generating arrival time identification reference values in synchronism with the arrival time control clocks generated by the arrival time control clock generating means; (c) a lock flag producing means for producing a lock flag indicative of a synchronization condition of the arrival time control clock generating means a preselected period of time after a first one of the packets is inputted to the arrival time control clock generating means; (d) an adding means for adding the lock flag along with the arrival time identification reference values to the input packets; and (e) a recording means for recording the packets to which the arrival time identification reference values are added by the adding means on a storage medium.

According to the twenty fourth aspect of the invention, there is provided a packet recording apparatus comprising: (a) an arrival time control clock generating means for generating arrival time control clocks in synchronism with input of a time reference value added to input packets; (b) an arrival time identification reference value generating means for generating arrival time identification reference values in synchronism with the arrival time control clocks generated by the arrival time control clock generating means; (c) a synchronization determining means for determining whether the arrival time control clocks are synchronous with the input of the time reference value or not, the synchronization determining means providing a first signal when the arrival time control clocks are synchronous with the input of the time reference value and a second signal when the arrival time control clocks are asynchronous with the input of the time reference value; (d) an adding means for adding the arrival time identification reference values to the input packets; (e) a recording means for recording the packets to which the arrival time identification reference values are added by the adding means on a storage medium; and (f) a controlling means for controlling an operation of the recording means, the controlling means supplying the packets to the adding means at all times, activating the operation of the recording means in response to the first signal from the synchronization determining means, and deactivating the operation of the recording means in response to the second signal from the synchronization determining means.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 6(A) shows arrival time of packets;

FIG. 6(B) shows records on tracks of a magnetic tape;

FIG. 6(C) shows the relation between packets and output clocks when packets are reproduced from a track position a in FIG. 6(B);

FIG. 6(D) shows records on tracks of a magnetic tape;

FIG. 6(E) shows the relation between packets and output clocks when packets are reproduced from a track position b in FIG. 6(D);

FIGS. 13(A) to 13(D) are illustrations which show program map tables (PMT), respectively;

FIGS. 18(A) to 18(F) are time charts which show times when the same packet is recorded and reproduced by the systems shown in FIGS. 17(A) to 17(C);

DESCRIPTION OF THE PREFERRED EMBODIMENT

Figure 1:
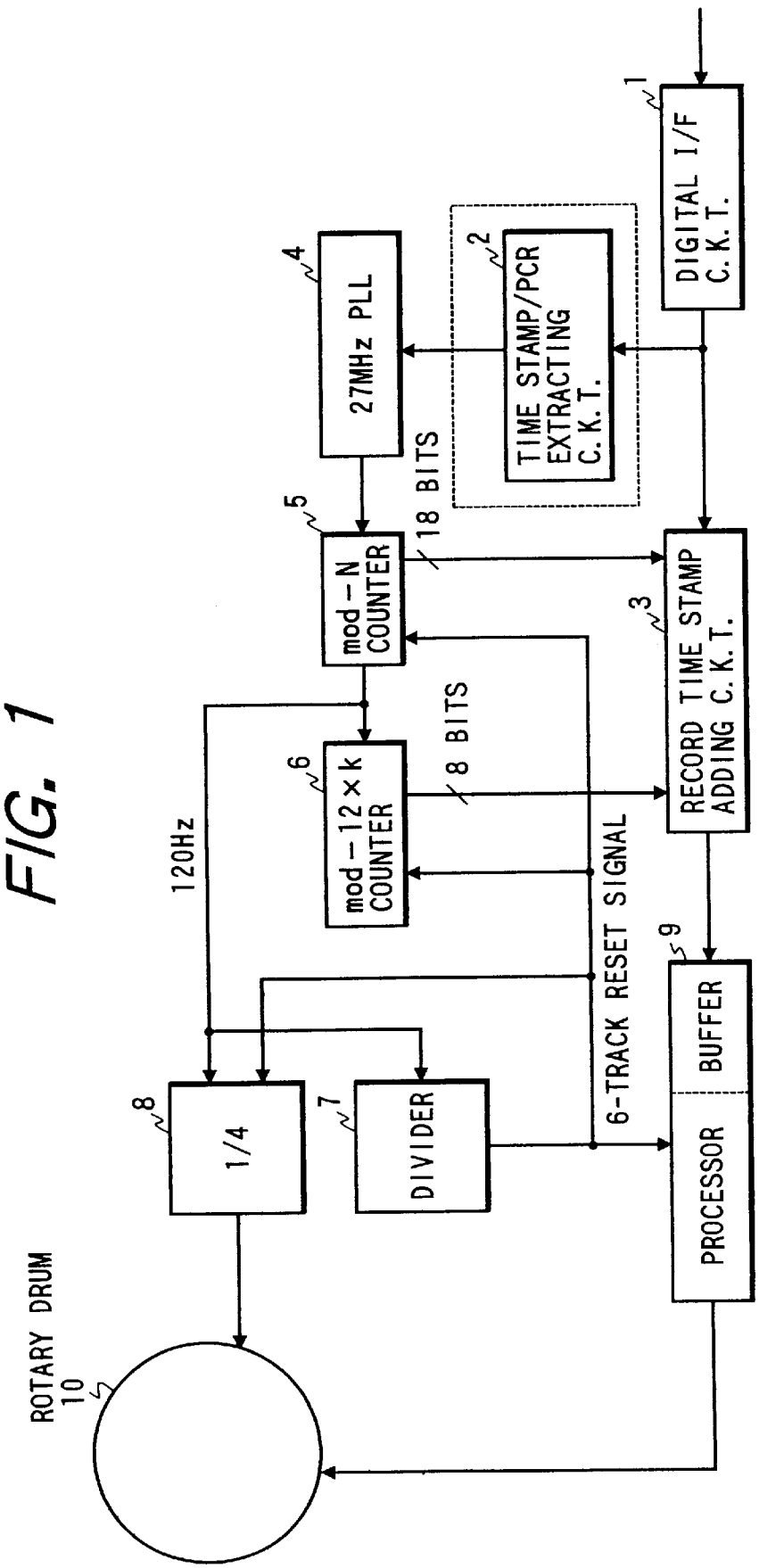
FIG. 1 is a block diagram which shows a recording system of a recording/producing apparatus according to the present invention.

Referring now to the drawings, particularly to FIG. 1, there is shown a recording system of a packet data recording/reproducing apparatus according to the first embodiment of the present invention which is employed in a digital television receiver.

Packets of multi-program received and modulated by the digital broadcasting receiver (hereinafter, referred to as a set top box) are supplied to a time stamp/PCR extracting circuit 2 and a time stamp adding circuit 3 through a digital interface (I/F) circuit 1. In general, typical set top boxes may be classified into two types: one is of the type which outputs received packets with time stamps indicative of times of arrival of received packets added to headers of the packets, and the second is of the type which outputs received packets without adding time stamps to headers of the packets. This embodiment may be used with both types.

The time stamp/PCR extracting circuit 2 extracts time stamps and a program clock reference (PCR) of a transport stream (TS) in the MPEG2 format out of headers of the packets and outputs them to a phase-locked loop (PLL) 4.

The PLL 4 outputs as arrival time control clocks oscillations at a frequency of, for example, 27 MHz in synchronism with changes in value of the time stamp or the PCRs. The time stamp/PCR extracting circuit 2 may be omitted for the simplicity of a system structure.

The arrival time control clocks from the PLL 4 are supplied to a mod-N counter 5 wherein they are divided by N (hereinafter, 1/N will be referred to as a division ratio). If the system frequency is 30 Hz, a value of N is set to 225000, and the mod-N counter 5 provides signals of 120 Hz. Alternatively, if the system frequency is 29.97 Hz, N is set to 225225, and the mod-N counter 5 provides signals of 119.88 Hz.

The output signals from the mod-N counter 5 are supplied to the time stamp adding circuit 3, a mod-12×k counter 6, and dividers 7 and 8. The time stamp adding circuit 3 adds time stamps each consisting of 32 bits indicating arrival times of the packets to headers of the packets supplied from the digital interface circuit 1. Even if the headers of the packets from the digital interface circuit 1 already have time stamps, the time stamp adding circuit 3 adds new time stamps to them instead.

The 32-bit time stamp consists of a 6-bit higher order section and a 26-bit lower order section. The 6-bit higher order section is provided as reserve. The 26-bit lower order section includes a count value from the counter 5 consisting of 18 lower-order bits and a count value of 10 Hz (if k=1) from the counter 6 consisting of 8 higher-order bits. Of the 8 higher-order bits, 4 higher-order bits are always 0s. It is assumed that the packets enter the digital interface circuit 1 at the same time intervals as those of arrivals of the packets at the set top box.

The divider 7 is designed to divide the output signals from the counter 5 by an integer determined according to a record/playback mode of operation to provide reset signals every 6 track cycle (hereinafter, referred to as a 6-track reset signal) to a processor 9, the counters 5 and 6, and the 1/4 divider 8, respectively. As examples of the record/playback mode, there is an STD (Standard) mode having a record rate of 19 Mbps×1 (ch) or an HD (High Density) mode having a record rate of 19 Mbps×2 (ch).

In the STD mode, the magnetic tape travels during a record mode of operation at a speed of half a standard speed of a typical VHS VTR. Two tracks are recorded on the magnetic tape with a scan every rotation of a rotary drum 10 which will be discussed later, and the time required for one-track scanning is 1/60 sec. Thus, in the STD mode, the divider 7 divides the output signals from the counter 5 by 12 to provide signals of 10 Hz so that six tracks may be recorded on the magnetic tape with 6-time scans (i.e., (1/60)×6=1/10 sec.) of the rotary drum 10. In the HD mode wherein two rotary heads disposed in the rotary drum 10 simultaneously record two parallel tracks every 1/60 sec. while the magnetic tape is traveling at the same speed as that in a standard mode of a typical VHS VTR, the division ratio of the divider 7 is set to 1/6 to provide signals of 20 Hz so that 6 tracks may be recorded on the magnetic tape with 3-time scans (i.e., (1/60)×3=1/10 sec.). Note that the division ratio 1/(12×k) of the counter 6, k indicates a ratio of the record rate of this system to that in the STD mode.

The output signals having a frequency of 30 Hz or 29.97 Hz from the 1/4 divider 8 are inputted to a drum speed control circuit (not shown) consisting of a motor and a driver as speed reference signals for the rotary drum 10. The rotary drum 10 then rotates at 30 rps or 29.97 rps. The rotary drum 10 has disposed thereon two rotary heads (not shown) having different azimuth angles (or double azimuth rotary heads) diametrically opposed to each other. The magnetic tape is wrapped helically about the rotary drum 10 over an angular range slightly greater than 180°.

To the two rotary heads, the packets whose headers have the time stamps, respectively, read out of a buffer memory of the processor 9 are supplied. The rotary heads then perform known helical scan recording on the magnetic tape.

The recording systems of this embodiment and shown in FIG. 8, as will be described later, produce track numbers indicative of the order of tracks to be recorded and record them on the magnetic tape. Specifically, the processor 9 specifies six consecutive track numbers repeatedly every input of the 6-track reset signal outputted from the divider 7 and records them on the magnetic tape through the rotary heads of the rotary drum 10. Thus, values of the time stamps and the track numbers are recorded on the magnetic tape with one-to-one correspondence. Similar to a typical helical scan type VTR, control pulses are also recorded on the magnetic tape every two-track cycle through a control head (not shown).

The recording system records tracks on the magnetic tape in a synchronous format, as will be discussed later in detail with reference to FIGS. 6(A) to 6(E), wherein changes in value of the time stamps and the positions of the recorded tracks are in synchronism with each other. Specifically, the rotary drum 10 rotates in synchronism with the changes in value of the time stamps that are changes of count values of the counters 5 and 6 to record the tracks on the magnetic tape in sequence. Simultaneously, the processor 9 specifies the positions of the tracks to be recorded every 6-track cycle in response to the 6-track reset signal provided in synchronism with the change in value of the time stamps for recording the packets having the time stamps on the magnetic tape.

Further, the recording system updates values of the time stamps every 6-track cycle in synchronism with speed control of the rotary drum 10 and adds them to the packets to be recorded.

Figure 2:
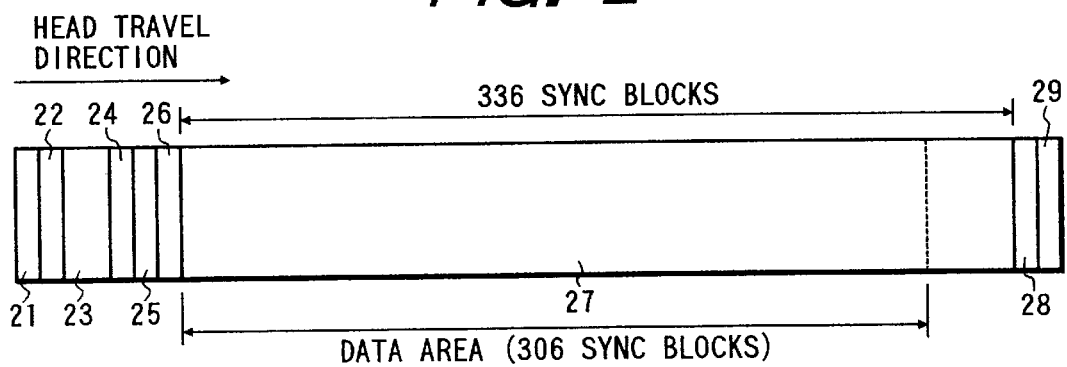
FIG. 2 is an illustration which shows a record format of a track on a magnetic tape used in a recording system of this invention.

FIG. 2 shows a track format used in the recording system of this embodiment. Each track, as shown in the drawing, consists of a marginal area 21, a preamble area 22, a sub-code area 23, a postamble area 24, an IBG area 25, a preamble area 26, a main data area 27, a postamble area 28, and a marginal area 29.

The main data area 27 is formed with a data area and an error correcting code area consisting of 336 sync blocks in total from a sync block number of 0 to 335. Of these sync blocks, the data area is defined by 306 sync blocks of a number that is a multiple of 6. The error correcting code area is an area in which an outer code (C3 code) for error correction is recorded and consists of 30 sync blocks.

The recording system of this embodiment is designed to selectively record both a digital signal having a packet size of 188 bytes in a transport packet (TP) transmission format (a first transmission format) according to MPEG2 and a digital signal having a packet size of 140 bytes in a packet transmission format (a second transmission format).

The track format is determined based on the relation among a recording wavelength, a required recording capacity for main data, a required recording capacity of another information, an area for clocks provided by the PLL 4, and a marginal area for editing. Particularly, the required recording capacity for the main data is determined under the condition that the main data consists of data sync blocks of a number that is a multiple of 6 that is a least common multiple of 2 sync blocks as a unit of record/reproduce operation in the first transmission format and 3 sync blocks as a unit of record/reproduce operation in the second transmission format. These sync blocks are arranged, in sequence, on a given data area as data blocks by scans of the rotary heads of the rotary drum 10.

Figure 3:
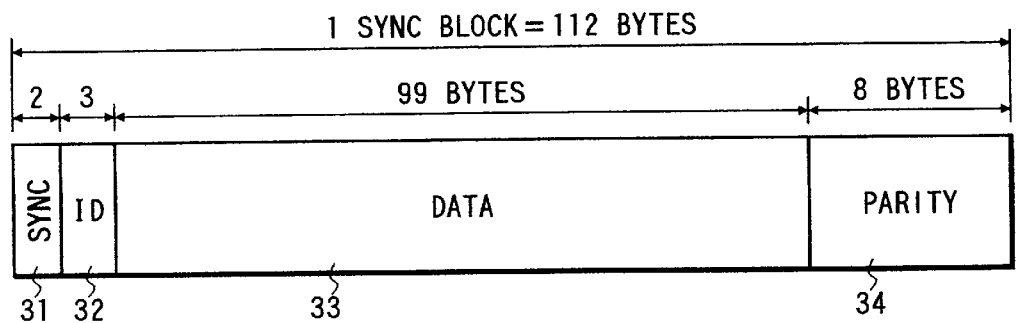
FIG. 3 is an illustration which shows a format of sync blocks defined on the track as shown in FIG. 2.

FIG. 3 shows one example of a sync block format. Each sync block, as can be seen from the drawing, consists of 112 bytes in total and includes a synchronizing signal (sync) area 31 consisting of 2 bytes for reproduction of the sync block, an address information (ID) area 32 consisting of 3 bytes, a data storage area 33 consisting of 99 bytes including a header, and a parity area 34 consisting of 8 bytes for correcting errors of information in the sync block, all of which are arranged in time sequence.

Figure 4:
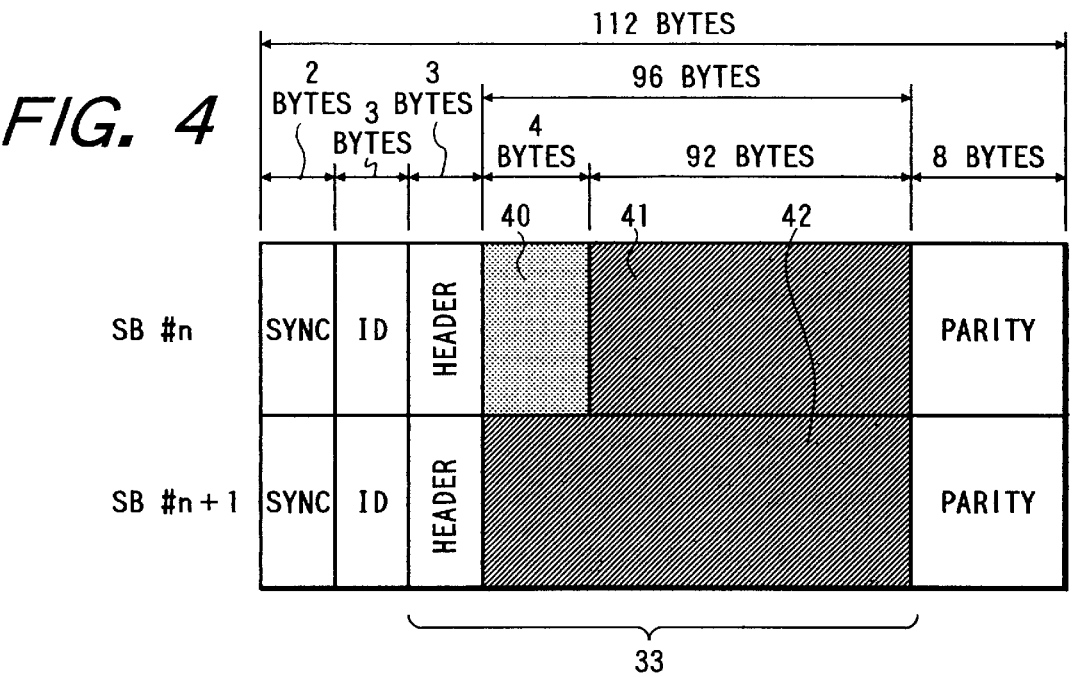
FIG. 4 is an illustration of a structure of sync blocks for recording a digital signal in a first transmission format.

In a digital signal-recording mode of operation in the MPEG2-TS format (the first transmission format) wherein the set top box does not add time stamps indicative of arrival times of received packets to headers of the packets, two sync blocks each formed with the one shown in FIG. 3 are arranged in parallel, as indicated by SB#n and SB#n+1 in FIG. 4, as one unit which is recorded in sequence for recording an input digital signal.

In the sync block SB#n shown in FIG. 4, the data storage area 33 consisting of 99 bytes has an additional information storage area 40 consisting of 4 bytes for storage of additional information (e.g., an arrival time of a packet or another information) about one packet (188 bytes) and a data storage area 41 for storage of a portion of one packet consisting of the first to 92th of 188 bytes. The adjacent sync block SB#n+1 includes a data storage area 44 for storage of the remaining 96-byte portion of the one packet consisting of 93th to 188th bytes. The time stamp is recorded on the additional information storage area 40.

The second transmission format wherein the set top box adds time stamps indicative of arrival times of received packets to headers of the packets is one of the U.S. digital TV broadcast regulations having a packet size of 130 bytes and transmits 140-byte data consisting of a 130-byte packet and a 10-byte additional data (e.g., dummy information or given additional information). Note that this 140-byte data will be referred to a packet for convenience in the following discussion. In this type of digital signal-recording mode of operation, three sync blocks each formed with the one shown in FIG. 3 are arranged in parallel, as indicated by SB#n, SB#n+1, and SB#n+2 in FIG. 5, as one unit which is recorded in sequence for recording an input digital signal.

Figure 5:
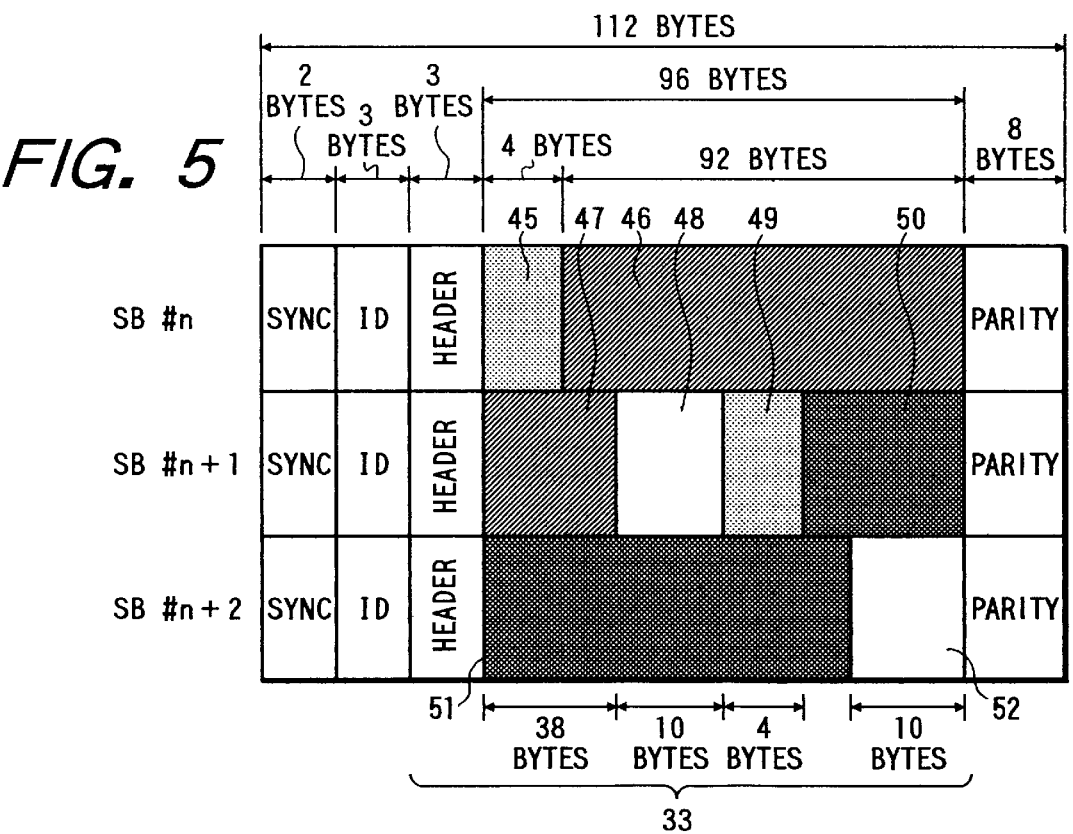
FIG. 5 is an illustration of a structure of sync blocks for recording a digital signal in a second transmission format.

In the sync block SB#n shown in FIG. 5, the data storage area 33 consisting of 99 bytes has an additional information storage area 45 and a data storage area 46. The additional information storage area 45 is provided for storage of 4-byte additional information (e.g., an arrival time of a packet or another information) about a first one of two packets (2×140=280 bytes). The data storage area 46 is provided for storage of packet data consisting of first to 92th bytes of the first packet.

In the sync block SB#n+1, the data storage area 33 has data storage areas 47 and 48, an additional information storage area 49, and a data storage area 50. The data storage areas 47 and 48 are provided for storage of packet data consisting of the remaining 38 bytes of the first one of the above two packets and additional data consisting of 10 bytes (e.g., dummy data or given additional information). The additional information storage area 49 is provided for storage of 4-byte information added to the second one of the two packets. The data storage area 50 is provided for storage of packet data consisting of first to 44th bytes of the second packet.

In the sync block SB#n+2, the data storage area 33 has data storage areas 51 and 52 for storing packet data consisting of the remaining 86-bytes of the second one of the above two packets and additional data (e.g., dummy data or additional information) consisting of 10 bytes. The time stamp is recorded on the additional information areas 45 and 49.

Therefore, in a digital signal in the first transmission format, one packet is, as apparent from the above, recorded in units of two sync blocks so that 153 (=306/2×1) packets are recorded on one track. In a digital signal in the second transmission format, two packets are recorded in units of three sync blocks so that 204 (=306/3×2) packets are recorded on one track.

FIGS. 6(A) to 6(E) show the positional relation among packets, time stamps, and track numbers recorded on tracks of the magnetic tape indicative of numbers (i.e., positions) of the tracks. In this embodiment, changes in time stamp are, as described above, synchronous with the positions of recorded tracks (i.e., the track numbers recorded on the magnetic tape), in other words, values of the time stamps correspond to the track numbers.

The values of time stamps (000, . . . , 500, . . . ), as shown in FIG. 6(A), correspond to values of the counters 5 and 6 derived in synchronism with reference clocks of the recording system shown in FIG. 1. The track numbers (0-00, . . . , 5-00, . . . ), as shown in FIG. 6(B), are specified in sequence by the processor 9 and recorded through the rotary heads of the rotary drum 10 in synchronism with the reference clocks. The track numbers are returned from 5-00 to 0-00 in response to the 6-track reset signal outputted from the divider 7. For example, the time 000 indicated by the first time stamp corresponds to the track number 0-00 (i.e., a leading track position).

Here, it will be assumed that a sequence of 100 packets consisting of 000th to 099th ones, as shown in FIG. 6(A), have arrived at the digital interface circuit 1 in ⅟60 sec., a 200th packet has arrived after ⅟60 sec. and then 250th and 300th packets have arrived intermittently at time intervals of ⅟120 sec. The first 100 packets and time stamps thereof are, as shown in FIGS. 6(B) and 6(D), recorded over adjacent two (i.e., two data storage areas as will be discussed later in detail) of the tracks recorded on the magnetic tape every ⅟60 sec. This is because the first 100 packets have arrived within a short period of time at a high data rate exceeding a recording rate of the system so that they cannot be recorded within one track. Thus, the first 100 packets are time-expanded by use of the buffer memory of the processor 9 and recorded over the adjacent two of the tracks.

The 200th and 250th packets and time stamps thereof are recorded on the following track in the order of arrival time. The 300th packet and a time stamp thereof is recorded on the second following track.

In the following discussion, the above recording format wherein the packets are recorded according to arrival times thereof, respectively, will be referred to as a pseudo real time format. If there is no packet between the 200th packet and the 250th packet as shown by I labeled between FIGS. 6(A) and 6(B), the 250th packet and the time stamp thereof may be recorded immediately following the 200th packet and the time stamp of the 200th packet on the same track. This will be referred to as a front-close format below.

In either of the pseudo real time format and the front-close format, it is advisable that the packets be recorded in the order of arrival time thereof This is because a set of six time stamps are, as described above, recorded repeatedly at a time interval of six tracks so that values of the time stamps immediately preceding and following the 6-track reset signal from the divider 7 do not agree with the order of arrival of the packets.

The pseudo real time format and the front-close format will be discussed below in detail with reference to FIGS. 7(A) to 7(C).

Figure 7A:
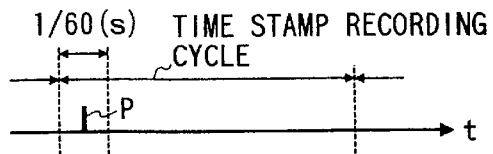
FIG. 7 (A) is a time chart which shows arrival of a time stamp P.
FIGS. 7(B) and 7(C) show a recording range for a packet in pseudo real time format and a front-close format.
Figure 7B:
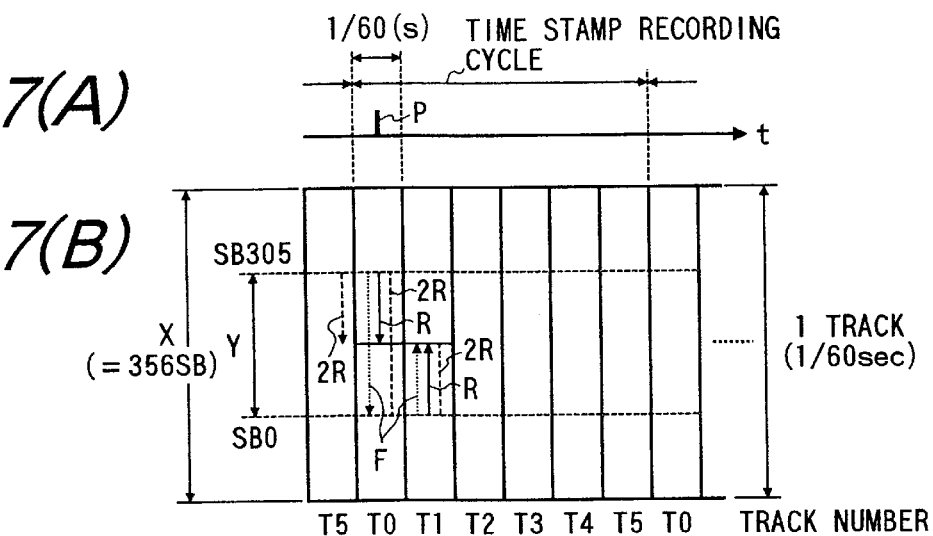

If a packet P is, as shown in FIG. 7(A), inputted in a one-track time interval (=1/60 sec.), in the pseudo real time format, the packet P is, as indicated by arrows R in FIG. 7(B), recorded from a location corresponding to the arrival of the packet P over adjacent two T0 and T1 of a set of six tracks T0 to T5. In the front-close format, the packet data P is, as indicated by an arrow F, recorded from a location preceding the position of arrival of the packet P over the adjacent tracks T0 and T1.

Specifically, the packet P is, as shown in FIG. 7(B), recorded in data areas Y on tracks each ranging from 0th sync block SB0 to 305th sync block SB305. In the pseudo real time format, the packet P which has arrived near the center of the track T0, as shown in FIG. 7(C), is recorded within an area R, corresponding to a data area of one track, ranging from a reference position M corresponding to the position of arrival of the packet P to a portion of a data area of the subsequent track T1. In the front-close format, the packet P is shifted close to the first sync block SB0 of the track T0 thereof and then recorded within an area F consisting of an area ranging from the first sync block SB0 to the reference position M and an area corresponding to the data area Y of one track following the reference position M over the subsequent track T1.

Figure 7C:
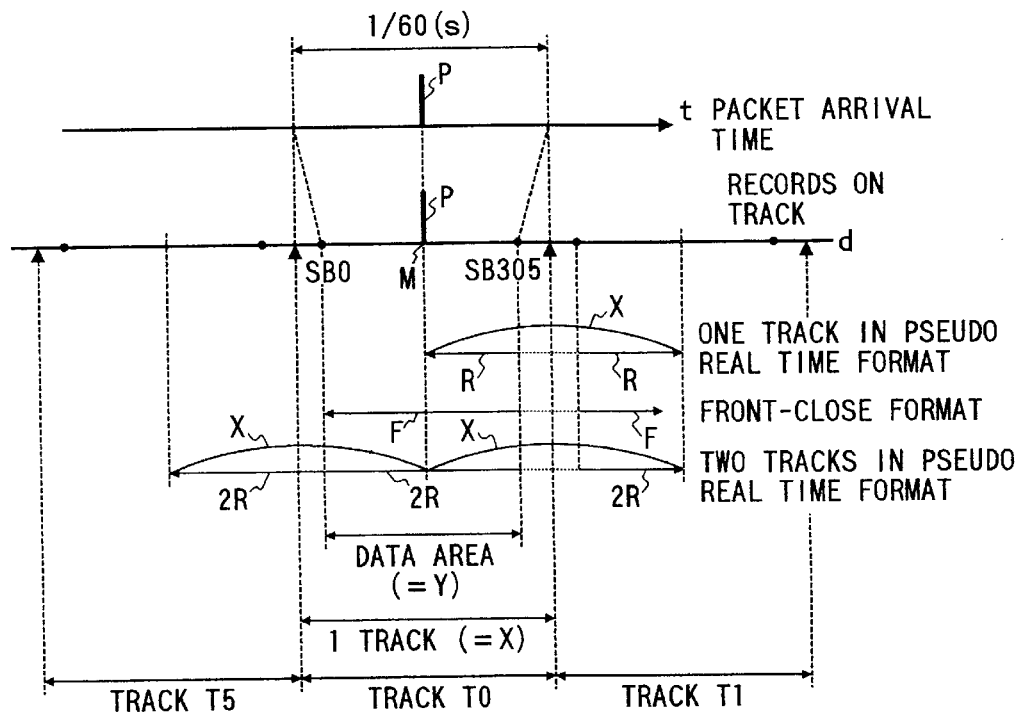

In FIGS. 6(B), 6(D), and 7(C), black triangles indicate boundaries of the tracks, and black circles indicate boundaries of the data areas.

Therefore, the pseudo real time format requires a buffer memory having a capacity (Mem) corresponding to one track, while the front-close format requires a buffer memory having a capacity (2Mem) corresponding to two tracks. In either format, the positions of packets to be recorded on a track may be changed as needed, thereby allowing a sequence of packets which have arrived at a high data rate to be time-expanded and recorded on the magnetic tape for effective utilization of a recording capacity of the magnetic tape. Additionally, it is possible to assign a specific area on a track to special data (e.g., high-speed reproducing data) provided in various data formats.

In the front-close format, consecutive packets are, as already described, moved close to a leading portion of the data area and recorded together, thus resulting in ease of design of the system as compared with the pseudo real time format.

A recording system using both the pseudo real time format and the front-close format requires a buffer memory having a recording capacity corresponding to at least two tracks. In this case, a recording range in the pseudo real time format may be extended over two tracks. Specifically, when a buffer memory having a capacity corresponding to two tracks is used in the pseudo real time format, the packet P arriving near the center of the track T0 shown in FIG. 7(C) is recorded within an area 2R ranging from the reference position M to two data areas of the immediately preceding and following tracks T5 and T1. The recording position of the packet P may thus be changed over a wide range, resulting in an increase in freedom of a recording operation.

Figure 8:
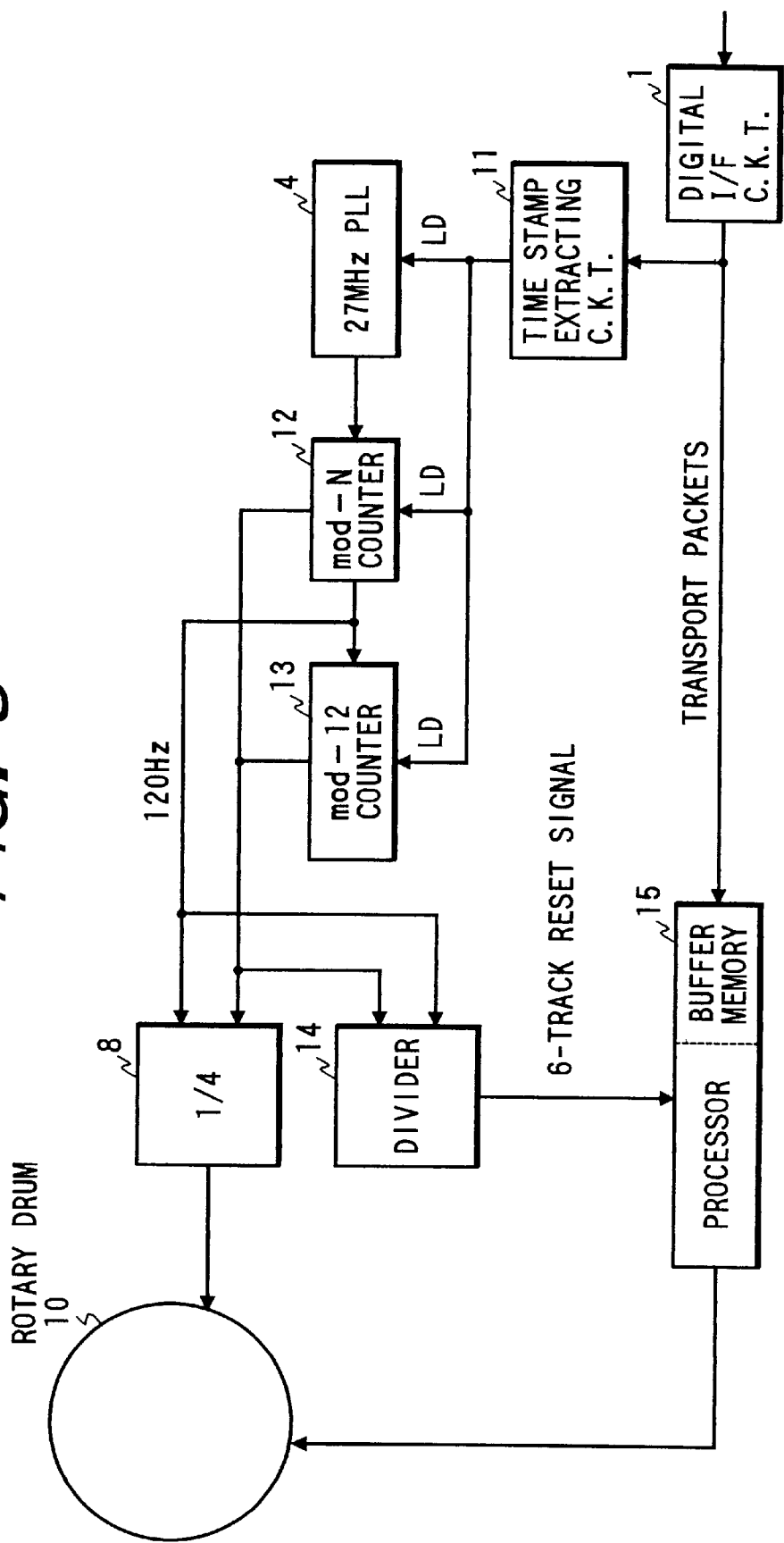
FIG. 8 is a block diagram which shows a recording system of a recording/reproducing apparatus according to the second embodiment of the invention.

Referring to FIG. 8, there is shown a recording system of the packet data recording/reproducing apparatus according to the second embodiment of the invention. The same reference numbers as employed in the above first embodiment refer to the same parts, and explanation thereof in detail will be omitted here.

The shown packet data recording system is of the type wherein the set top box adds time stamps indicative of times of arrivals of received packets to headers of the packets, and it is possible to reproduce rotary drum control pulses and the 6-track reset signals based on these time stamps.

Packets inputted to the digital interface circuit 1 are supplied to the time stamp extracting circuit 11. The time stamp exacting circuit 11 then extracts time stamps out of the packets and provides them as reference signals to the PLL 4, the mod-N counter 12, and the mod-12 counter 13.

The mod-N counter 12 divides an output signal from the PLL 4 by N (=225000) to produce a signal having a frequency of 120 Hz. The mod-12 counter 13 also divides the output signal from the mod-N counter 13 by 12 to provide signals having a frequency of 10 Hz to the 1/4 divider 8 and the divider 14. The mod-N counter 12 also produces clocks in synchronism with the time stamps in the packets for controlling the speed of the rotary drum 10 through the divider 8.

The output signal from the counter 12 is, as apparent from the above, inputted to the 1/4 divider 8 as a reset signal in addition to the output signal from the counter 13 for resetting it every 1/10 sec. within which the output signals from the counters 12 and 13 reach given values, respectively. This is for resetting the 1/4 divider 8 with high accuracy, however, the 1/4 divider 8 may alternatively be reset only by the output signal from the counter 13.

The divider 14 divides the input signal by 12 to provide a signal having a frequency of 10 Hz to the processor 15 as a reference signal (i.e., the 6-track reset signal). The processor 15 receives the packets through the digital interface circuit 1 and provides them to the rotary heads of the rotary drum 10 together with a set of track numbers produced repeatedly in synchronism with the 6-track reset signal from the divider 14.

The recording system of this embodiment is of the so-called synchronization type wherein packets are recorded in synchronism of changes in value of the time stamps with the positions of tracks on the magnetic tape. Specifically, clocks which are synchronous with the time stamps added to headers of the packets are produced for controlling the speed of the rotary drum 10 to record the track number signals on the magnetic tape.

Figure 9:
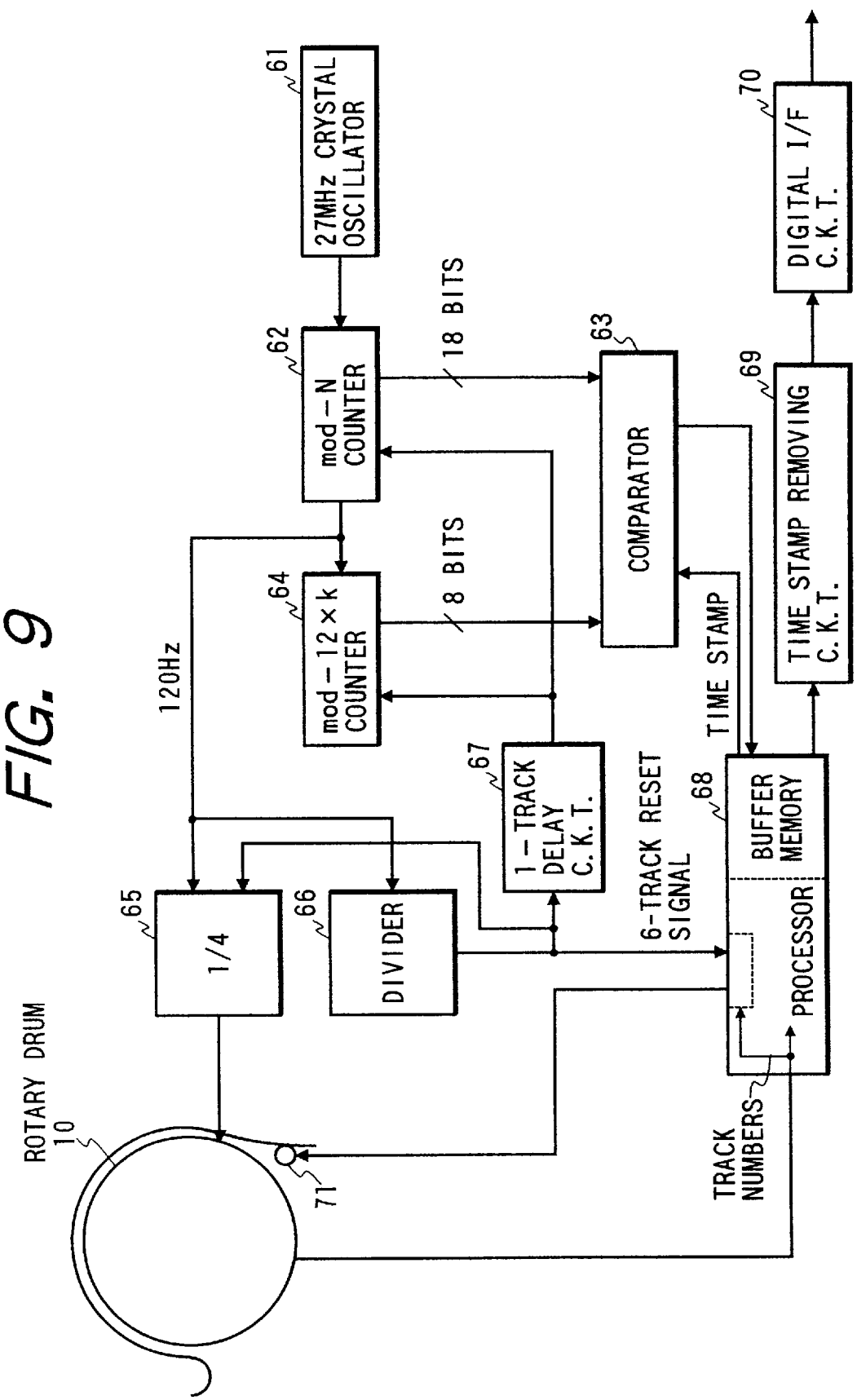
FIG. 9 is a block diagram which shows a reproducing system of a recording/reproducing apparatus of the invention.

FIG. 9 shows a reproducing system of the packet data recording/reproducing apparatus which is designed to reproduce packets recorded on the magnetic tape by the synchronization type recording system as shown in FIG. 1 or 8.

Digital signals recorded on the magnetic tape are reproduced by rotary heads (not shown) disposed in the rotary drum 10 and then supplied to the processor 68.

Oscillation signals (i.e., clocks) of 27 MHz outputted from the crystal oscillator 61 are divided by the mod-N counter 62 to provide signals that are submultiples (1/N) of the oscillation signals to the comparator 63, the mod-12×k counter 64, and the 1/4 divider 65, respectively. The 1/4 divider 65 provides control signals to the rotary drum 10 to control the speed thereof. The divider 66 provides reference signals (i.e., the 6-track reset signals) to the processor 68, the 1/4 divider 65, and the counters 62 and 64 through the one-track delay circuit 87.

The divider 66 has a division ratio of 1/12 in the STD mode of a reproduce operation, while it has a division ratio of 1/6 in the HD mode of the reproduce operation. k of a division ratio 1/(12×k) of the counter 64 indicates a ratio of the record rate of this system to that in the STD mode.

The processor 68 identifies track numbers of the signals reproduced from the rotary drum 10, compares them with the 6 -track reset signals from the divider 66, and provides a capstan speed control signal to a motor (not shown) of a capstan 71 to control a transit phase of the magnetic tape so that the track numbers may be synchronous with the 6-track reset signals. The speed control of the capstan 71, similar to a typical helical scanning type VTR, also uses reproduce control pulses. The processor 68 extracts the time stamps from the reproduced signals and supplies them to the comparator 63.

The output from the divider 66 which is synchronous with the speed control of the rotary drum 10 is supplied as a reset signal to the 1/4 divider 65 and undergoes a delay of a one-track period of time through the one-track delay circuit 67. The one-track delay circuit 67 then provides output time control reset signals to the counters 62 and 64.

Therefore, count values of the counters 62 and 64 are in synchronism with the positions of the tracks on the magnetic tape with one-track offsets therefrom. The 18-bit count value of the counter 62 and the 8-bit count value (i.e., the output clocks) from the counter 64 are compared in the comparator 63 with 18 lower order bits of a 26-bit time stamp of the reproduced signal outputted from the processor 68 and 8 higher order bits of the 26-bit time stamp, respectively, to determine whether they coincide with the 18 lower order bits and 8 higher order bits of the 26-bit time stamp or not. If a positive answer is obtained, the comparator 63 provides an output control signal to the processor 68.

The processor 68 is responsive to the output control signal from the comparator 63 to read the reproduced signals out of an internal buffer memory and supplies them to the time stamp removing circuit 69. The time stamp removing circuit 69 removes the time stamps from the reproduced signals to provide packets to the set top box through the digital interface circuit 70. The set top box then expands the packets in a modulation operation to output them as, for example, picture and audio signals.

In operation, for example, when a set of packets recorded at the packet positions 000 to 099 are reproduced from a first position a in FIG. 6(B), they are, as shown in FIG. 6(C), delayed one-track period of time and reproduced in ⅟60 sec. in the original order of arrival of the packets. In FIGS. 6(C) and 6(E), a character Mem indicates the capacity of the buffer memory of the processor 68 required during reproduction.

In the output clocks shown in FIGS. 6(C) and 6(E) (i.e., count values of counters 62 and 64 in FIG. 9), one having a value of, for example, 500 which is offset a one-track period of time is produced at the position 0-00 on the track. Based on this output clock, corresponding packets having time stamps are outputted. This is because the packet at the packet position 000 which is a leading one of the time-expanded packet set needs to be delayed the one-track period of time in order to reproduce an original time interval between itself and a trailing one of the time-expanded packet set at the packet position 099.

When the packets are reproduced from the packet position 099, as shown in FIG. 6(D), the following one at the packet position 200 is, as shown in FIG. 6(E), reproduced a one-track period of time after the 099th packet is reproduced.

In this reproducing system for the synchronization type recording format, the positions of the packets on the tracks, as apparent from the drawings, correspond to the output clocks from the counters 62 and 64. In the pseudo real time format, there are fixed offsets or one-track periods of time between the positions of the packets on the tracks and the output clocks. Specifically, the output clocks show values which are offset the one-track periods of time, respectively. In this reproducing system, the capacity of the buffer memory in the processor 68 may be small, similar to those of the recording systems as described above. There is no need for a great capacity of a buffer memory as in an asynchronous format which will be described later with reference to FIGS. 11(D) and 11(E).

Figure 10:
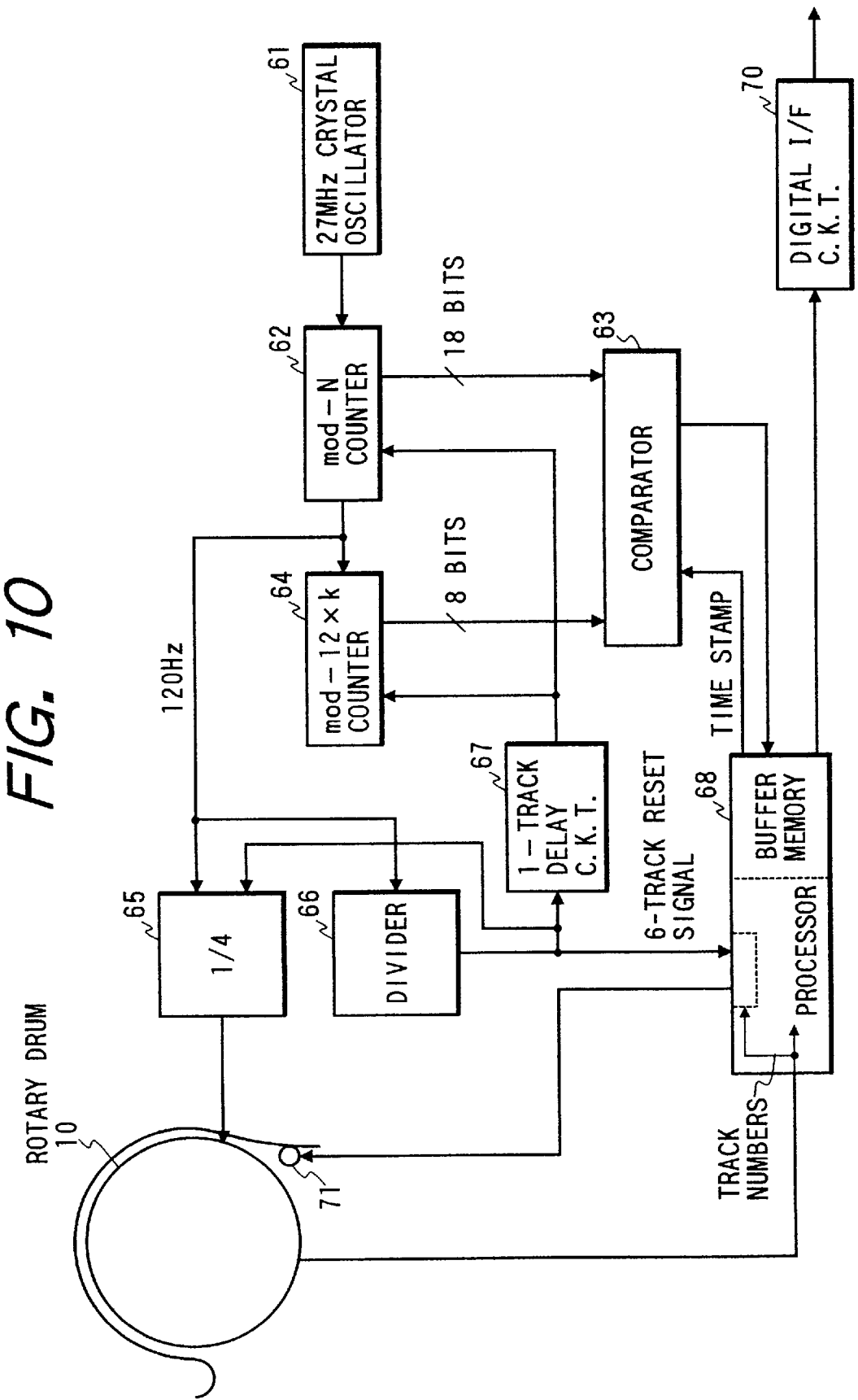
FIG. 10 is a block diagram which shows a modification of reproducing system of a recording/reproducing apparatus of the invention.

FIG. 10 shows a modification of the reproducing system of the packet data recording/reproducing system. The same reference numbers as employed in FIG. 9 refer to the same parts, and explanation thereof in detail will be omitted here. This reproducing system is designed for reproducing packets recorded on a magnetic tape by the above recording system wherein time stamps are added to the packets received by the set top box.

The reproducing system of this embodiment has no time stamp removing circuit 69 as used in the reproducing system of FIG. 9. The packets having headers to which time stamps are added are reproduced from the magnetic tape through the rotary drum 10 and then inputted to the processor 68. The comparator 63 provides readout signals to the processor 68 when the time stamps read out of the processor 68 coincide with output time control clocks provided by the counters 62 and 64 to transmit the packets stored in the processor 68 directly to the digital interface circuit 70.

The reproducing systems shown in FIGS. 9 and 10 require buffer memories in the processors 68 whose capacities are enough to reproduce packets recorded in the front-close format (i.e., two times that required in the pseudo real time format) in order to reproduce packets recorded in the pseudo real time format.

The above discussion refers to the synchronous format, however, the reproducing systems of this invention may be used for reproducing packets recorded in the asynchronous format wherein changes in value of time stamps are asynchronous with the positions of tracks. The asynchronous format will be discussed below with reference to FIGS. 11(A) to 11(E). In the following discussion, it is assumed that packets and time stamps are, as shown in FIGS. 11(A) and 11(D), recorded in the magnetic tape in the pseudo real time format regardless of the positions of tracks.

Figure 11:
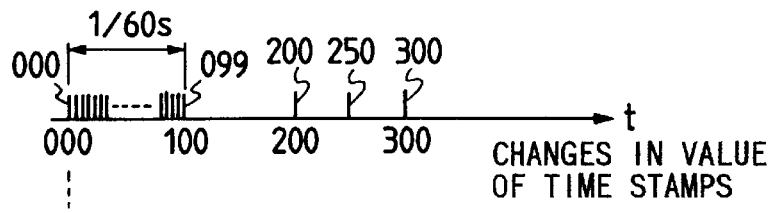
FIG. 11(A) shows arrival time of packets.
FIG. 11(B) shows records on tracks of a magnetic tape in asynchronous format.
FIG. 11(C) shows the relation between packets and output clocks when packets are reproduced from a track position a in FIG. 6(B)
FIG. 11(D) shows records on tracks of a magnetic tape.
FIG. 11(E) shows the relation between packets and output clocks when packets are reproduced from a track position b in FIG. 11(D)

In operation, when the packets are, as shown in FIG. 11(B), reproduced from the first packet a at the packet position 000, they are, as shown in FIG. 11(C), delayed a one-track period of time, after which the output clocks whose initial value is determined based on the time stamp 000 added to the first packet at the packet position 000, are produced. The packets at the packet positions 000 to 099 are reproduced in ⅟60 sec., and then the packets following the packet position 200 are reproduced at a one-track time interval after the packet at the packet position 099 is reproduced. Thus, the packets are reproduced at original time intervals between arrivals of the packets. In FIGS. 11(C) and 11(E), a character Mem indicates the capacity of the buffer memory of the processor 68 required during reproduction.

When the packets are reproduced from the packet position 099 as shown in FIG. 11(D), the 099th packet is, as shown in FIG. 11(E), reproduced after a delay of the one-track period of time, and the following 200th packet is also reproduced the one-track period of time after the 099th packet is reproduced. This is because although the 099th packet is not a leading one (i.e., the 000th packet) of the time-expanded packet set, it is difficult to determine whether the 099th packet is one of the time-expanded packet set or not upon reproduction, thus requiring the 099th packet to be outputted from the processor 68 after a delay of the one-track period of time. Additionally, the 200th packet which arrived at a one-track time interval following arrival of the 099th packet may be recorded immediately after the 099th packet. In this case, it is necessary to output from the processor 68 the 200th packet after a delay of the one-track period of time following the 099th packet in order to reproduce the original time intervals between arrivals of the packets.

Therefore, the reproduction of packets recorded in the asynchronous and pseudo real time format requires a capacity of the buffer memory in the processor 68 which is substantially twice that used during recording.

The recording of the packets in the asynchronous and front-close format requires a capacity of the buffer memory which is twice that required in the synchronous and pseudo real time format, while the reproduction in the asynchronous and front-close format requires a capacity of the buffer memory which is 3 or 4 times that required in the synchronous and pseudo real time format, however, the above described asynchronous reproducing system is simpler in design than the synchronous systems as shown in FIGS. 1 and 8 to 10.

In either of the synchronous and asynchronous recording systems, the pseudo real time format and the front-close format as discussed in FIGS. 7(A) to 7(C) allow the position of packets on the tracks of the magnetic tape to be determined optionally within a given range. Thus, even if packets have arrived at a high data rate, a recording capacity of the magnetic tape is utilized without any loss by time-expanding the packets and recording them on the magnetic tape. Additionally, it is also possible to assign specific areas on the tracks to recording of special data (e.g., high-speed reproducing data).

Figure 12:
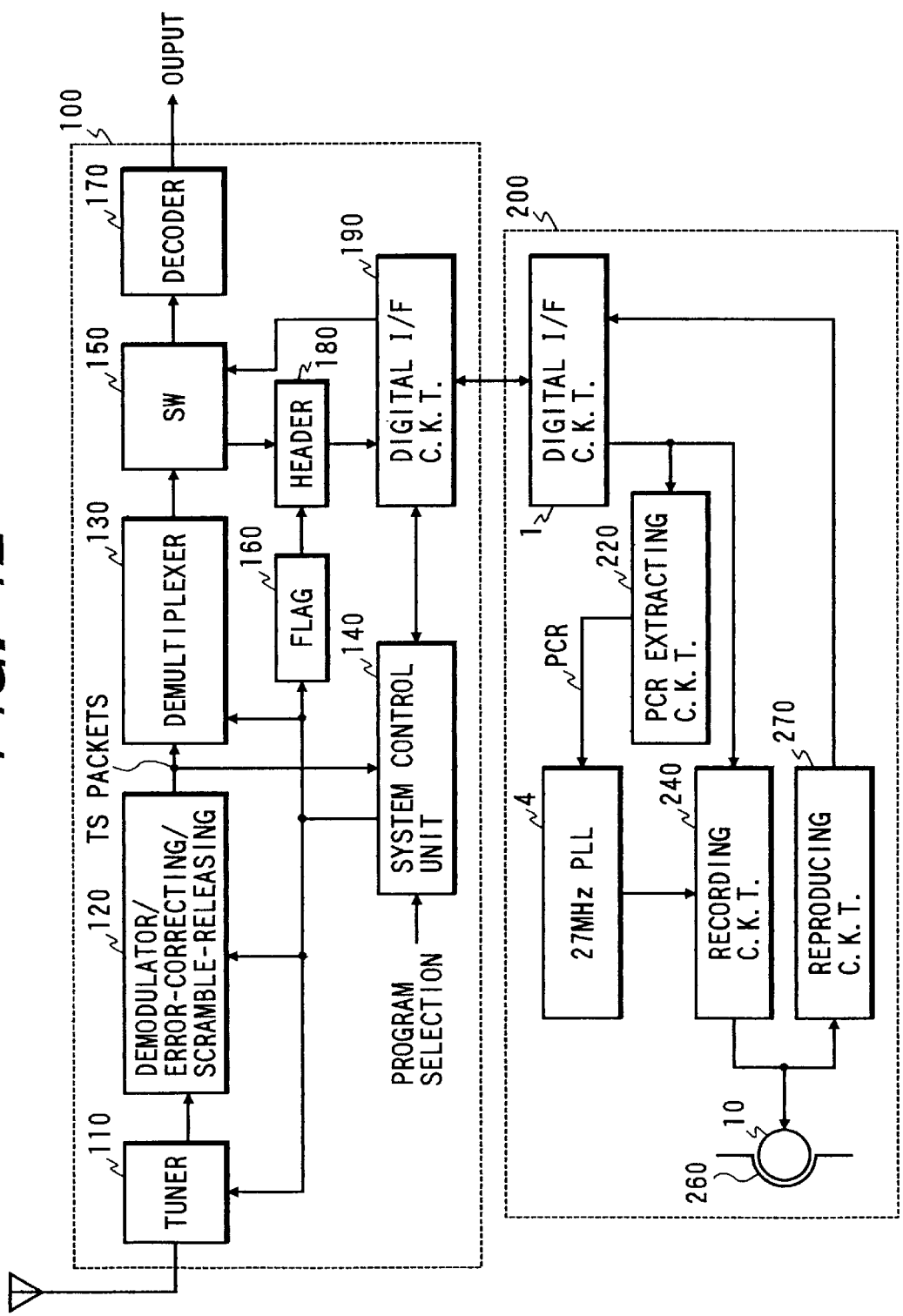
FIG. 12 is a block diagram which shows a broadcasting receiver and a packet recording/reproducing apparatus according to an alternative embodiment.

FIG. 12 shows a digital broadcasting receiver 100 and a packet data recording/reproducing apparatus 200 with which the above described recording and reproducing systems may be used.

The digital broadcasting receiver 100, which is in general referred to as a set top box, receives digital TV programs. The digital broadcasting receiver 100 includes generally a tuner 110, a digital demodulation/error correcting/scramble releasing circuit 120, a demultiplexer 130, a system control unit 140, a switching circuit 150, a flag circuit 160, a decoder 170, a header adding circuit 180, and a digital interface circuit 190.

The packet data recording/reproducing apparatus 200 is a helical scan type magnetic recording/reproducing system which is designed to receive packets transmitted through the digital broadcasting receiver 100 to record them on a magnetic tape and to reproduce packets recorded on a magnetic tape to provide them to the digital broadcasting receiver 100. The packet data recording/reproducing apparatus 200 includes generally a digital interface circuit 1, a PCR (Program Clock Reference) extracting circuit 220, a 27 MHz-PPL 4, a recording circuit 240, a drum 10, and a reproducing circuit 270.

In the following discussion, it is assumed that the digital broadcasting receiver 100 receives digital multi-channel CS broadcasting signals consisting of transport streams of MPEG2. The reception of these broadcasting signals requires channel selection in the tuner 110 and specification of packets, and thus PSI (Program Specific Information) serving to allow the broadcasting receiver 100 to select a desired channel regardless of use of transmission lines, is usually transmitted together with packets each having a fixed length of 188 bytes.

The PSI includes a program association table (PAT), a program map table (PMT), a conditional access table (CAT), and a network information table (NIT). The PAT represents packet identifiers (PIDs) in the PMT which transmits information about packets of a program. "0" is usually assigned to the PID of the PAT itself. The PMT represents PIDs of packets transmitting a stream of picture, audio, and additional data of each program. The PID of the PMT itself is specified by the PAT. The CAT represents the PIDs of packets transmitting cryptoanalysis information for releasing scrambles. The NIT represents physical information about transmission lines.

In operation, digital broadcasting signals are received by the tuner 110 through an antenna of the broadcasting receiver 100. The tuner 110 then receives signals from a desired transponder specified by a channel selection signal provided by the system control unit 140 based on a user's program selection information and provides it to the digital demodulation/error correcting/scramble releasing circuit 120. The digital demodulation/error correcting/scramble releasing circuit 120 demodulates and error-corrects the input signal and releases the scramble thereof to provide transport stream (TS) packets to the demultiplexer 130. The demultiplexer 130 separates from the TS packets of multiple programs from the desired transponder ones of a desired channel specified by the channel selection signal from the system control unit 140.

To the demultiplexer 130, the 188-byte packets having the PIDs and tables of the PSI are inputted in sequence. The demultiplexer 130 always looks up the PAT of the PSI whose PID is zero (0) to select a desired program and specifies required PIDs by look-up using the PMT for the selected program to separate from the input packets ones specified by the required PIDs.

For example, assuming that the PAT represents, as shown in FIG. 13(A), a PID of "05" for a program 1, a PID of "07" for a program 2, and a PID of "09" for a program 3, the demultiplexer 130, when the program 1 is selected, looks up the PMT shown in FIG. 13(B) specified by the PID of "05" to separate packets whose PIDs are 10 and 11 and a packet whose PID is 12 from the TS packets for reproducing audio data of CH1 and CH2 and video data through the decoder 170.

Similarly, when the program 2 is selected, the demultiplexer 130 looks up the second PMT shown in FIG. 13(C) specified by the PID of "07" to separate from the TS packets ones for audio data of the CH1 and CH2 whose PIDs are 20 and 21 and one for video data whose PID is 22 for reproducing them through the decoder 170. Alternatively, when the program 3 is selected, the demultiplexer 130 looks up the third PMT shown in FIG. 13(D) specified by the PID of "09" to separate from the TS packets ones for audio data of the CH1 and CH2 whose PIDs are 30 and 31 and one for video data whose PID is 22 for reproducing them through the decoder 170. The specified PIDs may be fixed until a completion of each program or alternatively changed by another PAT and PMT.

Referring back to FIG. 12, the packets derived by the demultiplexer 130 are supplied to the switching circuit 150. When it is required to reproduce the program through a monitor (not shown), the switching circuit 150 transmits the received packets to the decoder 170. The decoder 170 decodes the received packets in synchronism with clocks having a constant frequency of 27 MHz provided by extracting a PCR from a PCR packet of a selected program (e.g., a packet whose PID=15 in the program 1) to provide a picture and sound to the monitor.

When the received packets are recorded on the magnetic tape 260 through the recording/reproducing apparatus 200, the switching circuit 150 is selectively connected to the header adding circuit 180 to provide the received packets thereto. The header adding circuit 180 adds 4-byte headers to all the 188-byte received packets from the switching circuit 150 to transmit them to the recording/reproducing apparatus 200 through the digital interface circuit 190. These headers have flag areas for identifying the PCR.

The flag circuit 160 selects one having the PCR from the received packets in response to a control signal from the system control unit 140. The header adding circuit 180 provides a PCR identification flag to the flag area of the header to be added by the header adding circuit 180 to the packet having the PCR for the purpose of facilitating easy extraction of the PCR in the recording/reproducing apparatus 200.

For example, when the programs 1 and 2 are recorded together, the PID of the packet to which the PCR of the program 1 is added is "15" as shown in the PMT of the program 1 in FIG. 13(B), while the PID of the packet to which the PCR of the program 2 is added is "25" as shown in PMT of the program 2 in FIG. 13(C) so that the PCR-added packets are different between the program 1 and program 2. In this case, the header adding circuit 180 provides the PCR identification flag to the header of the packet indicated either by the PID of 15 or by the PID of 25. This is because the use of the PCRs of both packets causes the PLL 4, as will be described later in FIG. 14, to fail to produce a signal having a constant frequency of 27 MHz which is a time base-synchronizing signal identical in frequency with a system clock during encoding since both the packets are out of phase with each other.

Alternatively, when the programs 1 and 3 are recorded, the PID of the packet to which the PCR of the program 1 is added is "15" as shown in the PMT of the program 1 in FIG. 13(B), and the PID of a packet to which the PCR of the program 3 is added is also "15" as shown in PMT of the program 2 in FIG. 13(D) so that the packets to which the PCRs are added in the programs 1 and 3 are the same. In this case, the header adding circuit 180 provides the PCR identification flag to the header of the common packet whose PID is 15.

The packets including one having the PCR identification flag are supplied to the digital interface circuit 1 through the digital interface circuit 190 which is controlled by the system control unit 140 and then transmitted to the PCR extracting circuit 220 and the recording circuit 240, receptively.

The PCR extracting circuit 220 detects the PCR identification flag from the input packets to extract the PCR from the packet having the PCR identification flag and provide it to the PLL 4. The PLL 4 provides a time base-synchronizing signal of 27 MHz which is identical with a system clock during encoding to the recording circuit 240.

Figure 14:
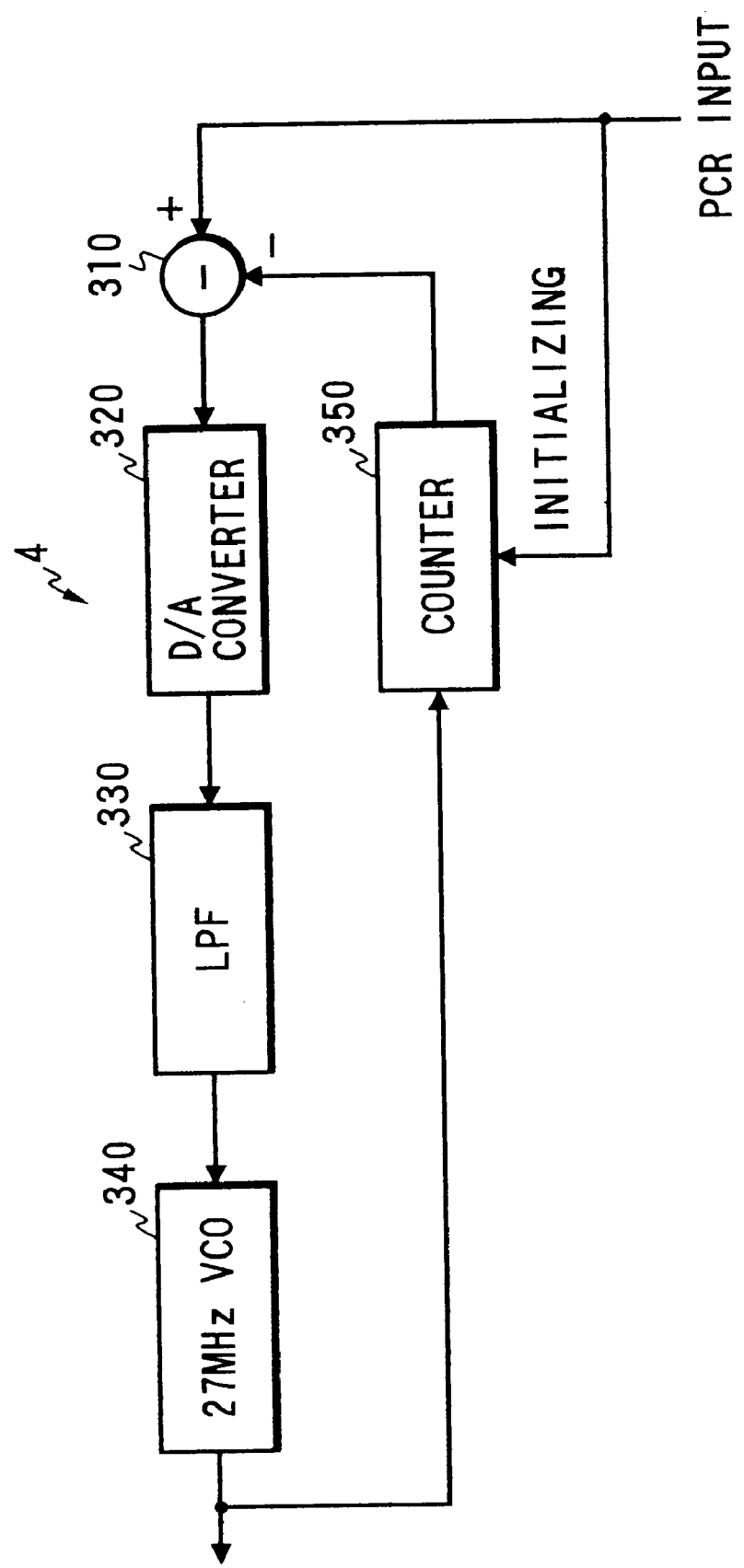
FIG. 14 is a block diagram which shows a structure of a PLL of the packet recording/reproducing apparatus shown in FIG. 12.

The PLL 4 has a structure as shown in FIG. 14. The input PCR enters the counter 350 to reset a count value thereof to a value of the PCR and also enters the subtractor 310 to determine a difference between the value of the PCR and a count value of the counter 350. This difference is converted into an analog signal by the D/A converter 320 and then supplied to the voltage-controlled oscillator (VCO) 340 through the low-pass filter (LPF) 330 to control an output frequency of the VCO 340. The VCO 340 provides oscillations of 27 MHz to the recording circuit 240 and the counter 350 as the system clocks. The counter 350 divides the input signal to provide a submultiple thereof to the subtractor 310.

Figure 15:
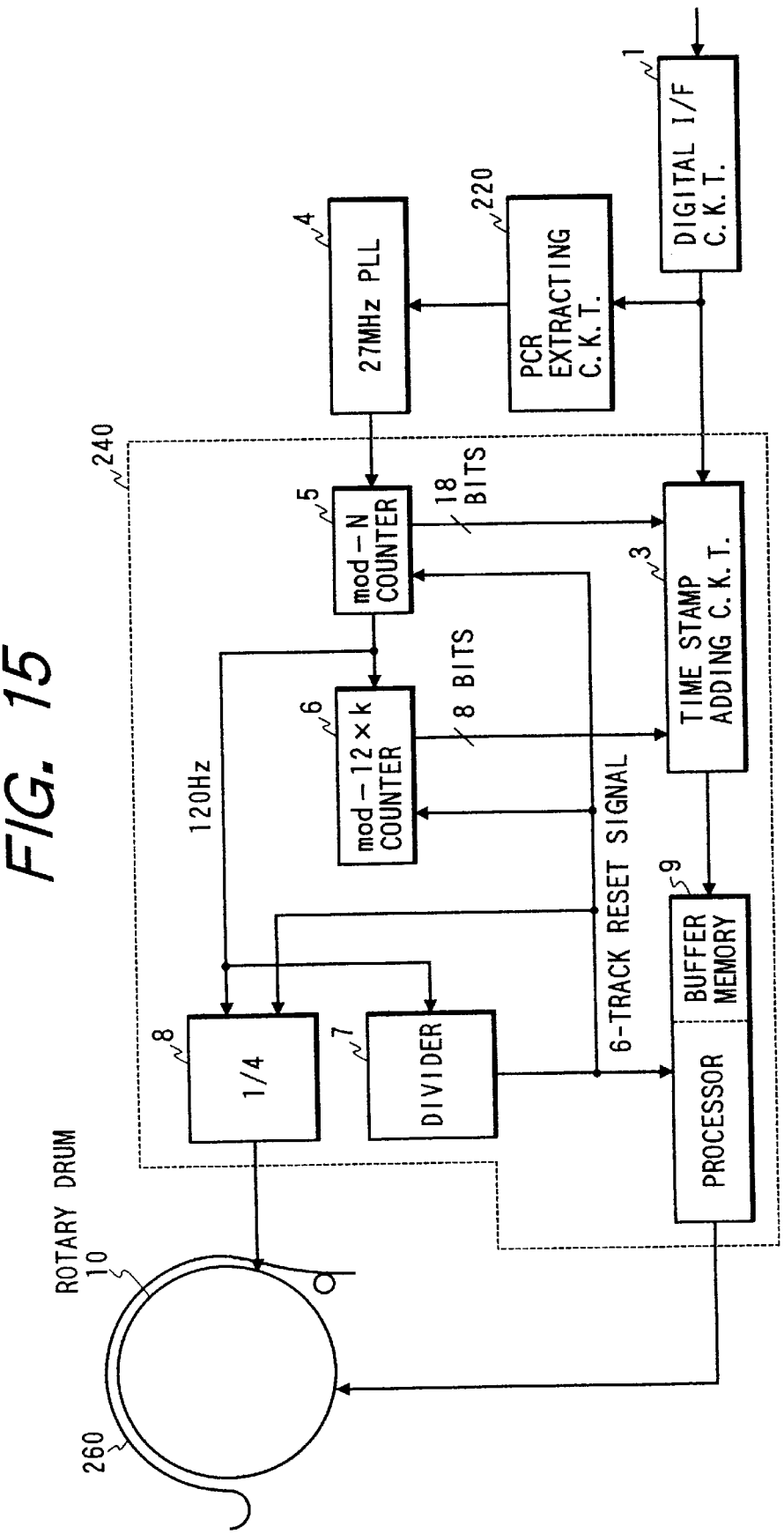
FIG. 15 is a block diagram which shows a packet recording unit of the packet recording/reproducing apparatus shown in FIG. 12.

Referring back to FIG. 12, the recording circuit 240 records the packets supplied to the digital interface circuit 1 from the digital broadcasting receiver 100 on the magnetic tape 260 through rotary heads (not shown) disposed in the rotary drum 10. The recording circuit 240 has a structure as shown in FIG. 15 which is identical with the one shown in FIG. 1, and explanation thereof in detail will be omitted here.

Figure 16:
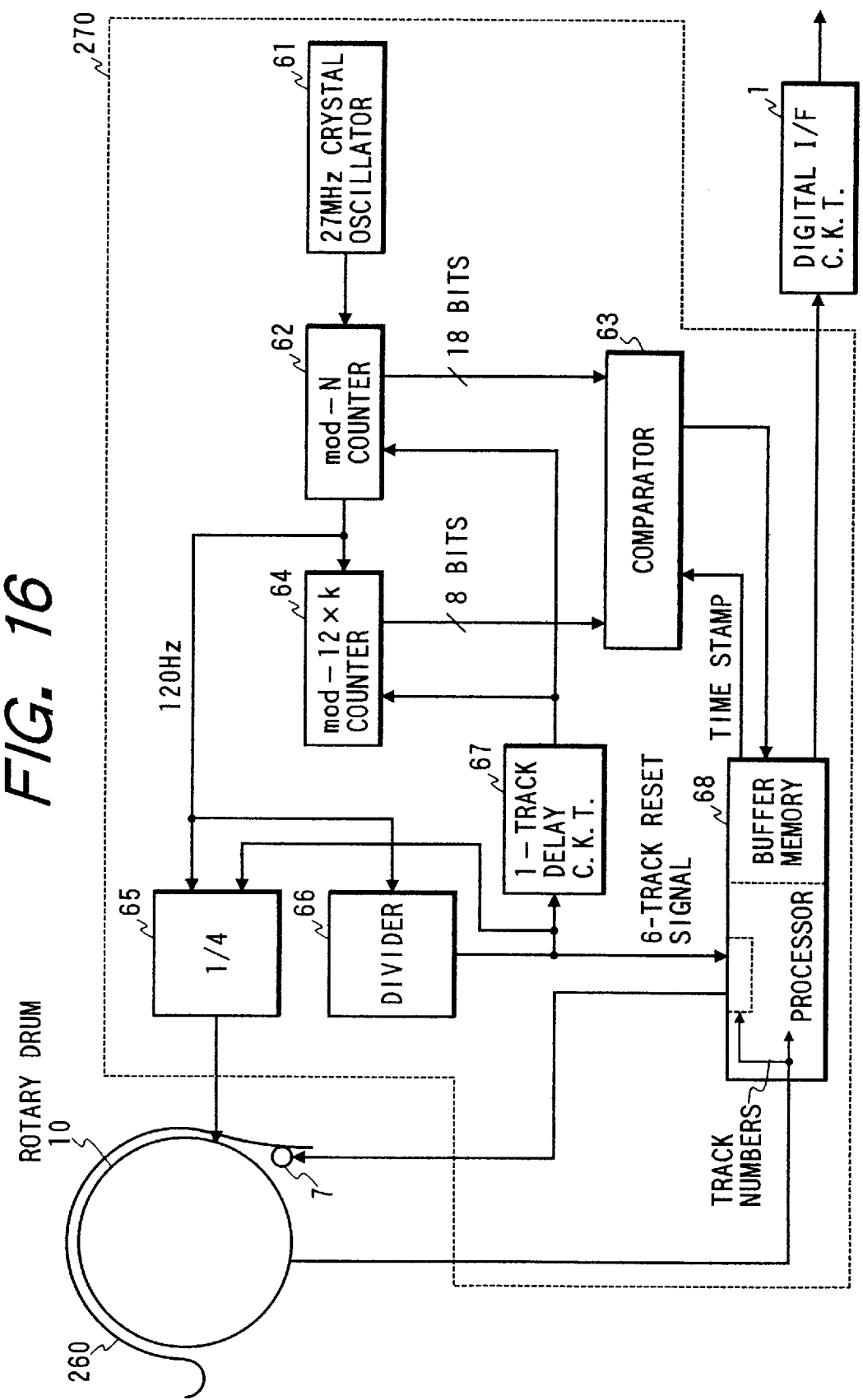
FIG. 16 is a block diagram which shows a packet recording unit of the packet recording/reproducing apparatus shown in FIG. 12 according to an alternative embodiment.

The reproducing circuit 270 has a structure as shown in FIG. 16 which is identical with the one shown in FIG. 10, and explanation thereof in detail will be omitted here.

The reproduced packets stored in the processor 68 are supplied to the digital interface circuit 190 through the digital interface circuit 1 in response to the output control signal from the comparator 68 and then transmitted to the decoder 170 through the switching circuit 150. Additionally, the PCR of the reproduced packets is extracted, and the PCR-extracted packets are supplied to 27 MHz-PLL (not shown). The decoder 170 expands the received packets in time in a modulation operation based on clocks from the PLL (not shown) to output them as picture and audio signals.

With the above arrangements, errors of the packet intervals and the data rate are not accumulated even if recording and reproducing of the same program are performed many times by different recording/reproducing apparatuses. This will be discussed below in detail with reference to FIGS. 17(A) to 17(C). The same reference numbers as employed in FIGS. 15 and 16 refer to the same parts.

Figure 17A:
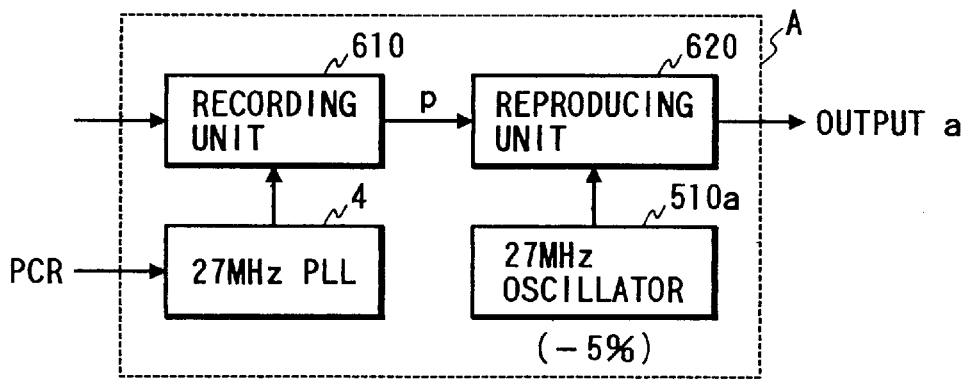
FIGS. 17(A) to 17(C) are illustrations which show packet recording/reproducing systems and a packet recording system for explaining errors in reproducing packets caused by a self-reproducing operation performed by the same system and recording/reproducing operations performed between two of the systems.

In the recording/reproducing apparatus A in FIG. 17(A), packets supplied from the broadcasting receiver 100 are inputted to the recording unit 610. A PCR extracted from the packets by the PCR extracting circuit 220 is supplied to the PLL 4. The PLL 4 produces a reference synchronizing signal in synchronism with the PCR and outputs it to the recording unit 610. The recording unit 610 has the same structure as that of the recording circuit 240 shown in FIG. 15 and records the packets on the magnetic tape p based on the reference synchronizing signal from the PLL 4. The magnetic tape p is reproduced in response to an output of 27 MHz from the oscillator 510*a* (corresponding to the crystal oscillator 61 in FIG. 16) by the reproducing unit 620 which has the same structure as that of the reproducing circuit 270 shown in FIG. 16 except for the crystal oscillator 61 to produce an output.

Referring to FIGS. 18(A) to 18(F), when a packet 2, as shown in FIG. 18(A), is received following a packet 1 at a regular time interval and inputted to the recording unit 610, the recording unit 610 operates, as described above, in response to the reference synchronizing signal which is synchronous with the PCR so that a time stamp "100" is, as shown in FIG. 18(B), added to the packet 2.

If the oscillator 510*a* provides to the recording unit 610 clocks having a frequency of 27 MHz with an error of −5% that is a lower limit of an allowable range of −5% to +5% which may be caused by a unit-to-unit deviation or aging thereof, the recording unit 620 reproduces, as shown in FIG. 18(C), the packet 2 having the time stamp "100" in response to a clock of "100" with timing −5% earlier than usual (i.e., a packet interval shown in FIG. 18(A)). This advanced timing is, however, within the allowable range of −5% to +5%, and there is no problem in self-recording/reproducing operations of the recording/reproducing apparatus A.

Figure 17B:
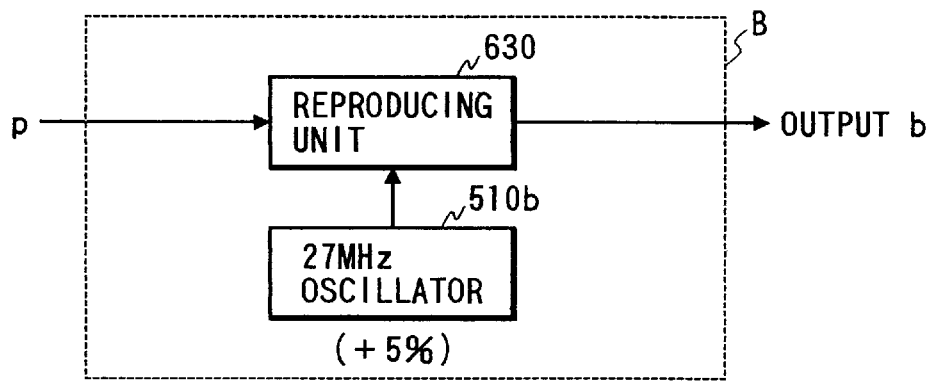

If the oscillator 510b of the reproducing apparatus B shown in FIG. 17(B) provides to the recording unit 630 which has the same structure as that of the recording unit 620 clocks having a frequency of 27 MHz with an error of +5% that is an upper limit of the allowable range of −5% to +5%, the recording unit 630 reproduces, as shown in FIG. 18(D), the packet 2 in response to the clock of "100" after a delay of +5% to provide an output b. This delay is, however, within the allowable range of −5% to +5%, and there is no problem in a reproducing operation of the reproducing unit B.

Figure 17C:
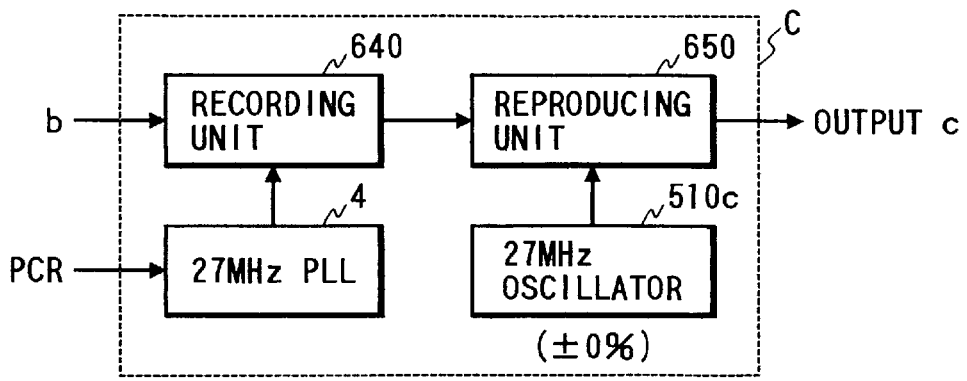

When the output b from the reproducing apparatus B is recorded by the recording unit 640 of the recording/reproducing unit C shown in FIG. 17(C), the time stamp "100" is, as shown in FIG. 17(E), added to the packet 2 in response to the clock of "100" having the same error of +5% as that in the reproducing operation of the reproducing unit B and then recorded on the magnetic tape since the recording unit 640 operates in response to the reference synchronizing signal from the PLL 4 which is synchronous with the PCR of the output b.

When the magnetic tape recorded by the recording unit 640 is reproduced by the reproducing unit 650, having the same structure as that of the reproducing unit 620, to which a clock having a frequency of 27 MHz with no error (i.e., ±0%) is inputted from the oscillator 510c, the packet 2 having the time stamp "100" is, as shown in FIG. 18(F), reproduced in response to the clock of "100" with original timing. Therefore, the errors of the clocks are not accumulated, allowing the recording/reproducing apparatus C to reproduce an input signal with correct timing.

Specifically, when recording and reproducing of the same program are performed many times between different devices, it will cause reproduced signals to impinge upon the data rate and the packet interval only depending upon a difference between the reference synchronizing signal supplied to the reproducing unit and the system clock during encoding, however, this is within an allowable range, resulting in a proper reproducing operation.

The reference synchronizing signals are, as described above, produced based on the PCR, however, may be based on an SCR (System Clock Reference) established by MPEG2. Alternatively, when the broadcasting receiver 100 adds time stamps which are synchronous with the PCR or SCR to packets and outputs them to the recording/reproducing apparatus 200, the recording/reproducing apparatus 200 may produce the reference synchronizing signals in synchronism with changes in value of the time stamps of the input packets.

The broadcasting receiver 100 may provide to the recording/reproducing apparatus 200 only a packet identifier (PID) of a packet including time control information for producing and recording clocks in a given manner. For example, the system control unit 140 of the broadcasting receiver 100 provides only the PID of the packet having the PCR to the PCR extracting circuit 220 of the recording/reproducing apparatus 200 through the digital interfaces 19 and 1 in a given manner (e.g., transmission control packets are provided to establish transmission of control information between the receiver 100 and the apparatus 200). The PCR extracting circuit 220 extracts the packet having the PCR from received packets based on the PID.

Figure 19:
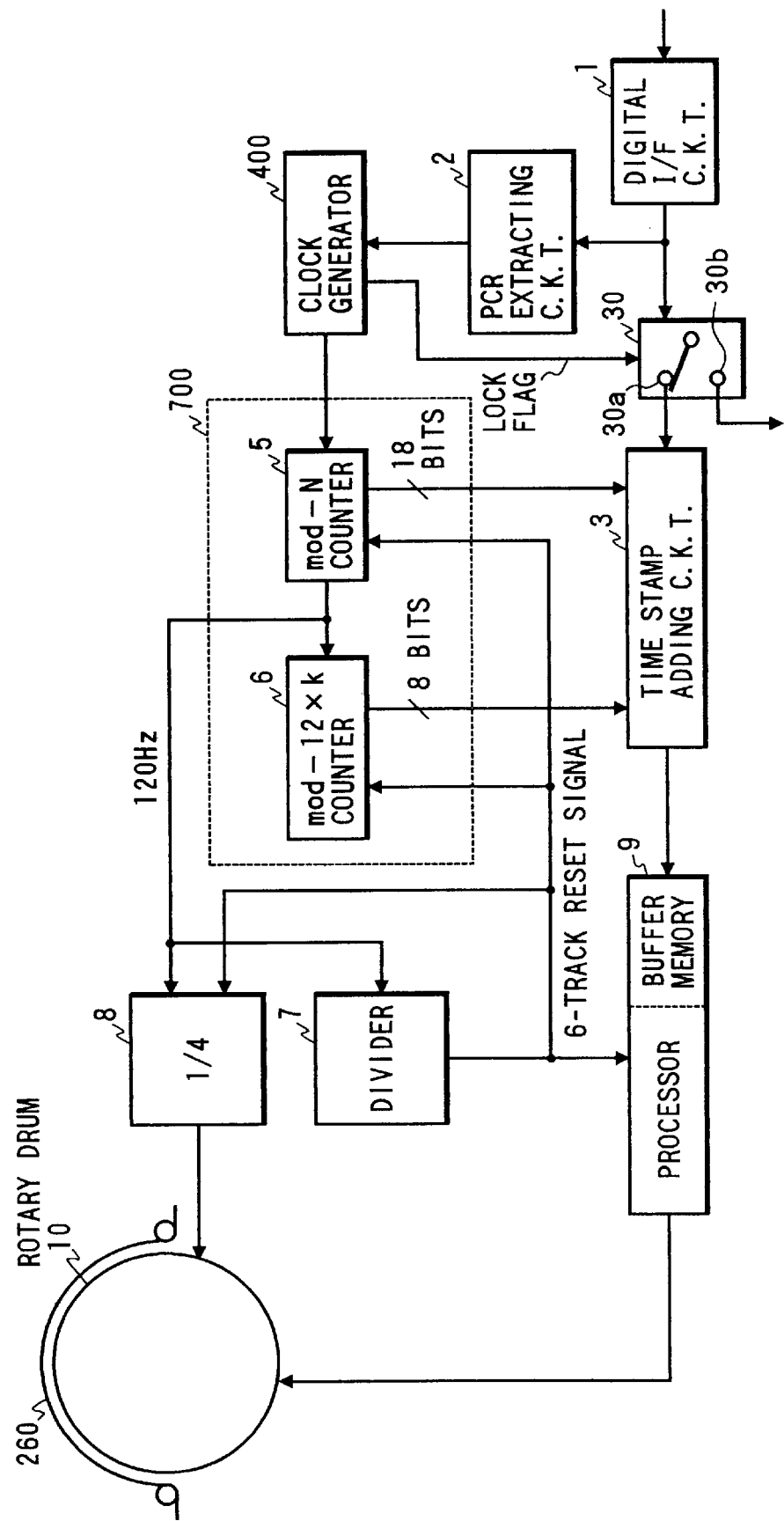
FIG. 19 is a block diagram which shows a packet recording system according to an alternative embodiment.

FIG. 19 shows a packet recording system of an alternative embodiment which may be employed in the recording/reproducing apparatus 200 as discussed above. The same reference numbers as employed in the above embodiments refer to the same parts, and explanation thereof in detail will be omitted here.

Packets of information on one or more programs and at least one packet having a PCR (Program Clock Reference) which are multiplexed in the form of digital signals are inputted through the digital interface circuit 1 to the PCR extracting circuit 2 and the switching circuit 30. The PCR extracting circuit 2 extracts the PCR from the input packets and provides it to the clock generator 400. The clock generator 400 then produces time base-synchronizing signals (i.e., arrival time control clocks) having a frequency of 27 MHz which is identical with that of system clocks during encoding and a lock flag, as will be described later in detail, indicating whether operations carried out in the clock generator 400 are in synchronization or not.

Figure 20:
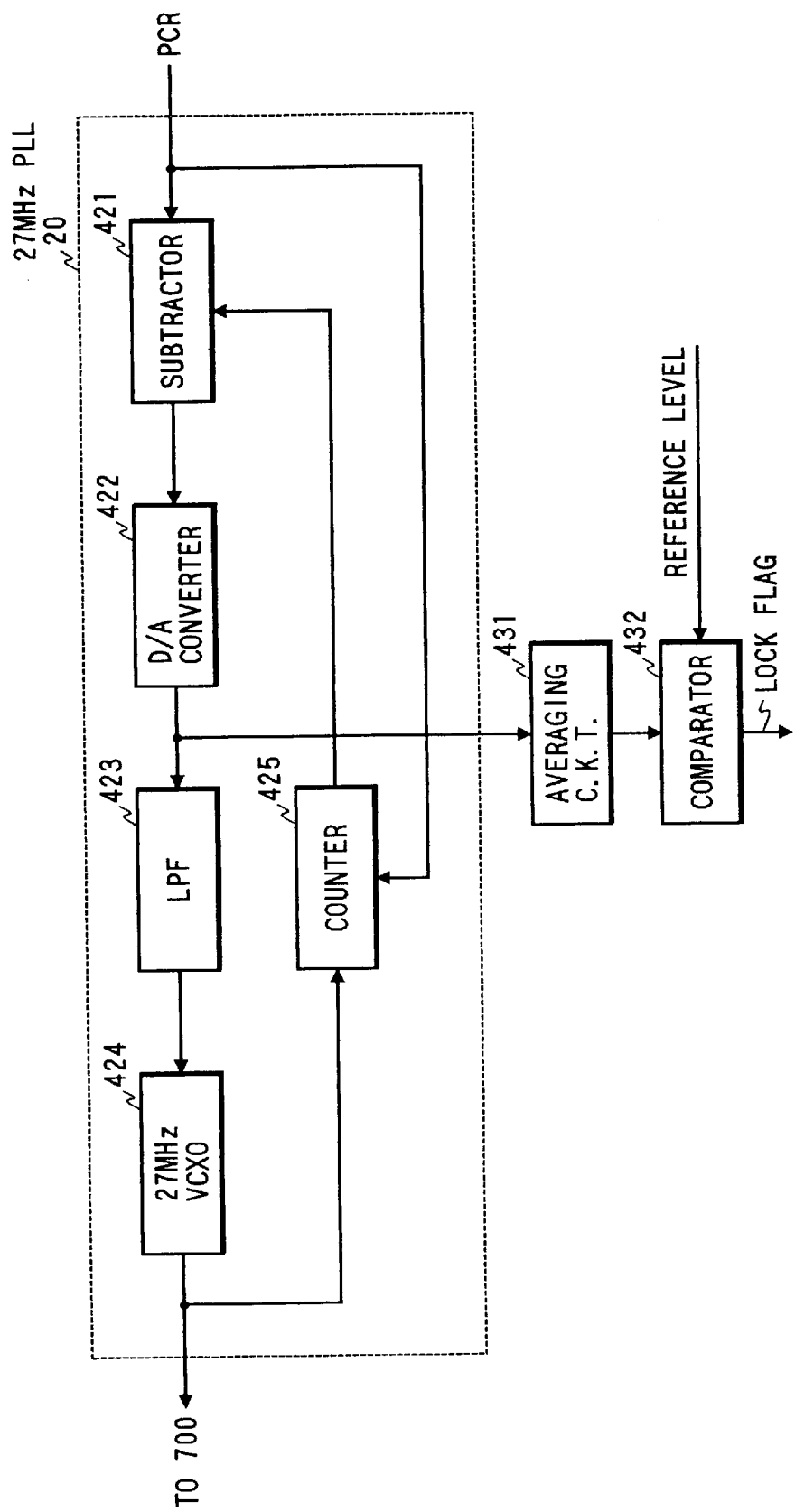
FIG. 20 is a block diagram which shows a structure of a PLL of the packet recording system shown in FIG. 19.

The clock generator 400, as shown in FIG. 20, includes a 27 MHz-phase-locked loop (PLL) 20, an averaging circuit 431, and a comparator 432. The PLL 20 is a feedback open-loop consisting of a subtractor 421, a D/A converter 422, a low-pass filter (LPF) 423, a voltage-controlled crystal oscillator VCXO) 424, and a counter 425.

The PCR outputted from the PCR extracting circuit 2 is supplied to the subtractor 421 and the counter 425. The counter 425 resets a count value thereof to a value of the PCR and provides it to the subtractor 421. The subtractor 421 determines a difference between the PCR and the output from the counter 425 to provide it to the D/A converter 422. The D/A converter 422 converts the input into an analog signal to provide it to the VCXO 424 through the LPF 423 for controlling an oscillation output of the VCXO 424. The VCXO 424 outputs as the time-base synchronizing signals (i.e., the arrival time control clocks) oscillations having a frequency of 27 MHz to the time stamp generator 700, as will be described later, and the counter 425. The counter 425 provides a submultiple of the input to the subtractor 421 as a feedback signal.

The analog signal from the D/A converter 422 is also supplied to the averaging circuit 431. The averaging circuit 431 performs an averaging operation to determine the average of absolute values or squares of the input analog signals derived for given operation cycles and provide it to the comparator 432. The comparator 432 compares the average with a given reference level.

When the PLL 20 is in a synchronous condition, the difference (i.e., an error) between the PCR and the count value of the counter 425 produced by the subtractor 421 shows a smaller value, thus causing an output signal level of the averaging circuit 431 to be smaller than the reference level inputted to the comparator 432. Alternatively, when the PLL 20 is in asynchronous condition, the difference produced by the subtractor 421 shows a greater value, thus causing the output signal level of the averaging circuit 431 to be greater than the reference level inputted to the comparator 432. Therefore, when the signal level outputted from the averaging circuit 431 is smaller than the reference level, the comparator 432 produces a logic value indicative of the synchronization of the PLL 20, while when it is greater than the reference level, the comparator 432 produces a lock flag having a logic value indicative of asynchronization of the PLL 20.

The output of the subtractor 421 may be supplied directly to the averaging circuit 431 to perform digital operations in the averaging circuit 431 and the comparator 432.

Referring back to FIG. 19, the clocks outputted at 27 MHz as the arrival time control clocks from the clock generator 400 are supplied to the mod-N counter 5 wherein they are divided by N. As described in the above first embodiment, if the system frequency is 30 Hz, a value of N is set to 225000, and the mod-N counter 5 provides signals of 120 Hz. Alternatively, if the system frequency is 29.97 Hz, N is set to 225225, and the mod-N counter 5 provides signals of 119.88 Hz.

The output signals from the mod-N counter 5 are supplied to the time stamp adding circuit 3, the mod-12×k counter 6, and the dividers 7 and 8. The mod-N counter 5 and the mod-12×k counter 6 constitute the time stamp generating circuit 700 which produces 32-bit arrival time identification references (i.e., time stamps) indicative of arrival times of the packets supplied from the digital interface circuit 1. The structure of each time stamp is the same as described above, and explanation thereof in detail will be omitted here.

The lock flag produced by the clock generator 400 is provided to the switching circuit 30 as a switching signal. When the lock flag shows the synchronization of operations of the clock generator 400, the switching circuit 30 establishes communication between the digital interface circuit 1 and a terminal 30a, while when it shows the asynchronization, the switching circuit 30 establishes communication between the digital interface circuit 1 and a terminal 30b.

Therefore, the packets transmitted to the digital interface circuit I are supplied to the time stamp adding circuit 3 through the switching circuit 30 only when the operation of the PLL 20 of the clock generator 400 is synchronous with the input of the PCR derived by the PCR extracting circuit 2. Alternatively, when the operation of the PLL 20 is not synchronous with the input of the PCR, the packets are discarded without being transmitted to the time stamp adding circuit 3.

The operations of the time stamp adding circuit 3, dividers 7 and 8, and the processor 9 are the same as those discussed in FIG. 1, and explanation thereof in detail will be omitted here.

Therefore, in the packet recording system of this embodiment, when the operation of the PLL 20 of the clock generator 400 is not synchronous with the input of the PCR from the PCR extracting circuit 2 so that the time stamp generating circuit 700 produces time stamps indicating arrival times of the packets inputted to the digital interface circuit 1 incorrectly, the packets are discarded through the switching circuit 3 without being recorded on the magnetic tape 260. This avoids underflow and overflow of a buffer memory provided in the processor 9.

Figure 21:
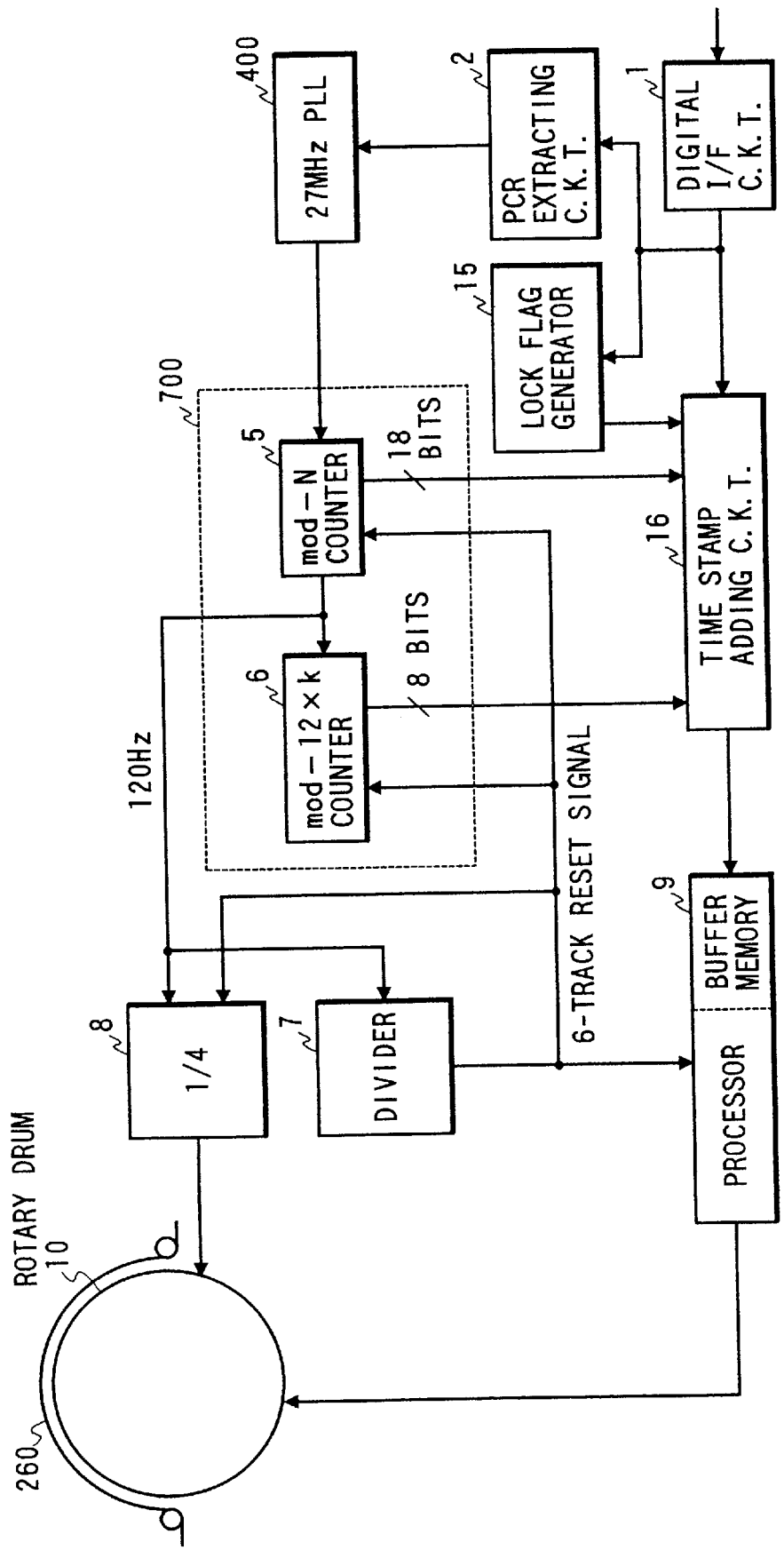
FIG. 21 is a block diagram which shows a packet recording system according to an alternative embodiment.

FIG. 21 shows a packet recording system of an alternative embodiment. The same reference numbers as employed in FIG. 20 refer to the same parts, and explanation thereof in detail will be omitted here.

The packets transmitted to the digital interface circuit 1 are supplied to the PCR extracting circuit 2, the lock flag generator 15, and the time stamp adding circuit 16, respectively.

The lock flag generator 15 produces first lock flags indicating that the operation of the PLL 20 is in asynchronous with the input of the PCR until a given period of time T expires following input of first one of the packets from the digital interface circuit 1 and second lock flags indicating that the operation of the PLL 20 is in synchronous with the input of the PCR after the given period of time T expires. The given period of time T is determined based on a response rate of the PLL 20. For example, the worst value of the PCRs may be used in determining the time T.

The lock flags produced by the lock flag generator 15 are supplied to the time stamp adding circuit 16 wherein they are added to headers of the packets from the digital interface circuit I along with the time stamps. The lock flag-added packets are then supplied to the rotary drum 10 through the processor 9 and recorded on the magnetic tape 260.

As apparent from the above discussion, in the packet recording system of this embodiment, even when the time stamp generator 700 produces time stamps not indicating arrival times of the packets correctly, the packets are recorded on the magnetic tape 260 along with the lock flags. This allows a packet reproducing system to provide information on whether packet intervals between reproduced packets are correct or not to a decoder, thereby avoiding the failure in reproduction.

Figure 22:
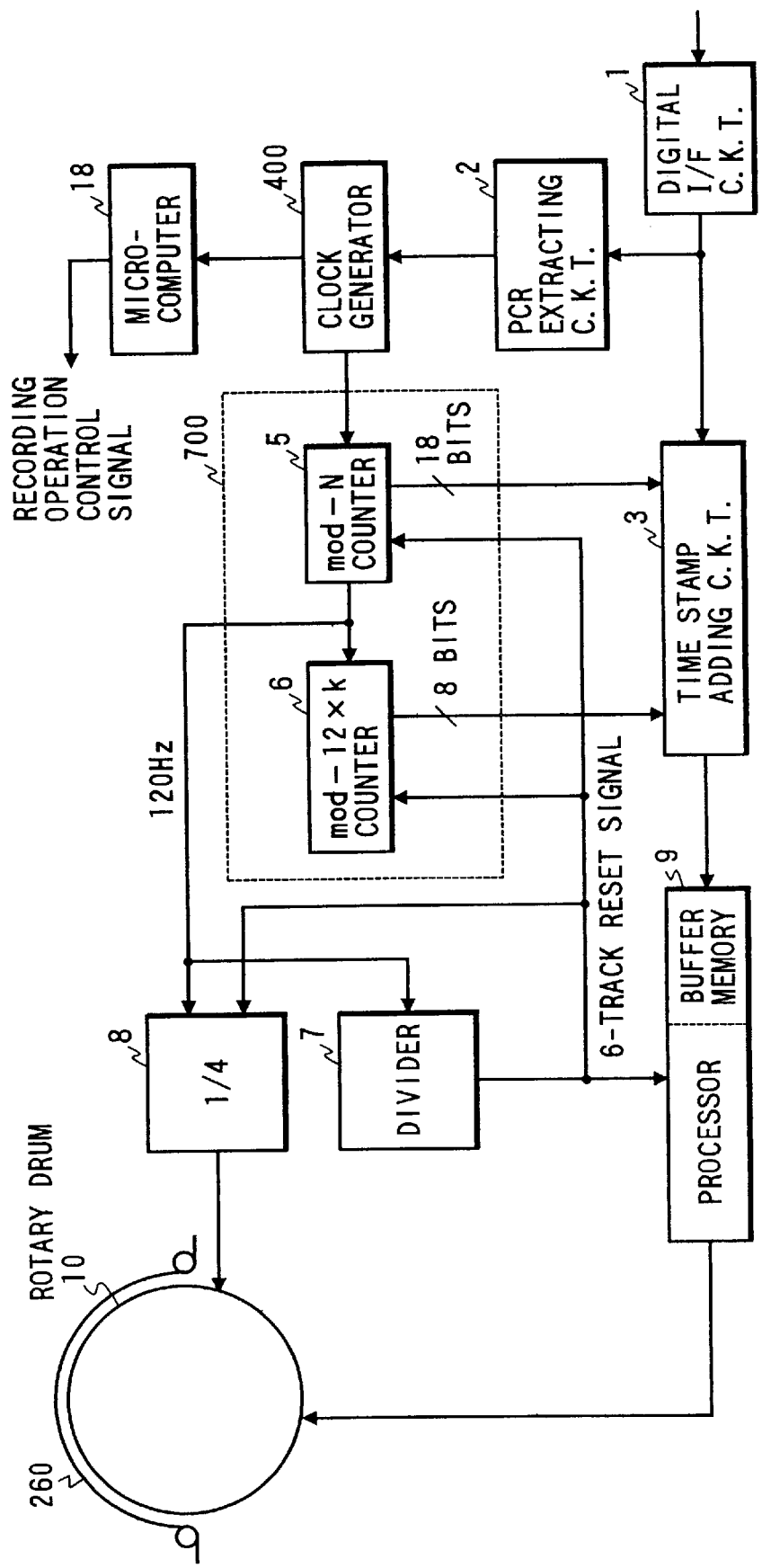
FIG. 22 is a block diagram which shows a packet recording system according to an alternative embodiment.

FIG. 22 shows a packet recording system of an alternative embodiment. The same reference numbers as employed in FIG. 19 refer to the same parts, and explanation thereof in detail will be omitted here.

The packets entering the digital interface circuit 1 are supplied to the time stamp adding circuit 3 and the PCR extracting circuit 2.

The lock flags produced by the clock generator 400 are supplied to the microcomputer 18 as well as the counter 5. When the lock flag inputted to the microcomputer 18 indicates that the operation of the PLL 20 of the clock generator 400 is synchronous with input of the POR provided by the PCR extracting circuit 2, the microcomputer 18 produces a first recording operation control signal to activate a recording operation of the system, allowing the packets to be recorded on the magnetic tape 260 through the rotary drum 10. Alternatively, when the lock flag indicates that the operation of the PLL 20 is asynchronous with the input of the PCR, the microcomputer 18 provides a second recording operation control signal to deactivate the recording operation, inhibiting the packets from being recorded on the magnetic tape 260. For example, the deactivation of the recording operation is achieved by blocking input of recording signals to the rotary heads of the rotary drum 10 or by stopping the magnetic tape 260 from traveling.

Therefore, in the packet recording system of this embodiment, only when the operation of the PLL 20 of the clock generator 400 is synchronous with the input of the PCR of the input packets, the packets receive the time stamps from the time stamp adding circuit 3 and then are recorded on the magnetic tape 260.

Specifically, when the operation of the PLL 20 of the clock generator 400 is not synchronous with the input of the PCR from the PCR extracting circuit 2 so that the time stamp generating circuit 700 produces the time stamps indicating arrival times of the packets inputted to the digital interface circuit 1 incorrectly, the packets are discarded through the switching circuit 3 without being recorded on the magnetic tape 260. This avoids underflow and overflow of a buffer memory provided in the processor 9.

The reference synchronizing signals are, similar to the above embodiments, produced based on the PCR, however, may be based on an SCR (System Clock Reference) established by MPEG2. Alternatively, when a broadcasting receiver adds time stamps which are synchronous with input of the PCR or SCR to packets and outputs them to a recording/reproducing apparatus, the recording/reproducing apparatus may produce the reference synchronizing signals in synchronism with changes in value of the time stamps of the input packets.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of recording input packets on a storage medium comprising the steps of:

generating arrival time control clocks for the input packets;

producing time stamps having values which indicate times of arrivals of the input packets and which are changed in synchronism with the arrival time control clocks to add the time stamps to the packets, respectively;

forming respective tracks on the storage medium in time sequence in response to reference control signals provided in synchronism with said arrival time control clocks and in synchronism with respective changes in time stamp values; and recording the packets to which the time stamps are added on the storage medium in order of arrivals of the packets so that each of the packets is recorded within a given area ranging from a reference position defined on one of the tracks corresponding to an arrival time of each of the packets to a given position away from the reference position at a preselected distance toward the following track.

2. A method of recording input packets on a storage medium as set forth in claim 1, wherein said recording step expands the packets in time to record them on the storage medium.

3. A method of recording input packets on a storage medium comprising the steps of:

generating arrival time control clocks for the input packets;

producing time stamps having values which indicate times of arrivals of the input packets and which are changed in synchronism with the arrival time control clocks to add the time stamps to the packets, respectively;

forming tracks on the storage medium in sequence in response to reference control signals provided in synchronism with said arrival time control clocks and in synchronism with respective changes in time stamp values; and recording the packets to which the time stamps are added on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

4. A method of recording input packets on a storage medium comprising the steps of:

generating arrival time control clocks in synchronism with changes in value of time stamps for arrival time identification added to the input packets;

forming tracks on the storage medium in sequence in response to reference control signals provided in synchronism with said arrival time control clocks and in synchronism with respective changes in time stamp values; and recording the packets with the time stamps on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

5. A method of recording input packets on a storage medium comprising the steps of:

generating arrival time control clocks for the input packets;

producing time stamps having values which indicate times of arrivals of the input packets and which are changed in synchronism with the arrival time control clocks to add the time stamps to the packets, respectively;

forming tracks on the storage medium in time sequence in response to reference control signals provided in synchronism with said arrival time control clocks and in synchronism with respective changes in time stamp values; and recording the packets to which the time stamps are added on the storage medium in order of arrivals of the packets so as to shift toward a first one of the packets at least one of the packets following the first one of the packets within a given area ranging from a reference position defined on one of the tracks corresponding to an arrival time of the first one of the packets to a given position away from the reference position at a preselected distance toward the following tracks.

6. A method of recording input packets on a storage medium comprising the steps of:

generating arrival time control clocks in synchronism with changes in value of time stamps for arrival time identification added to the input packets;

forming respective tracks on the storage medium in sequence in response to reference control signals provided in synchronism with said arrival time control clocks and in synchronism with respective changes in time stamp values; and recording the packets to which the time stamps are added on the storage medium in order of arrivals of the packets so as to shift toward a first one of the packets at least one of the packets following the first one of the packets within a given area ranging from a reference position defined on one of the tracks corresponding to an arrival time of the first one of the packets to a given position away from the reference position at a preselected distance toward the following tracks.

7. A packet recording apparatus for recording packets on tracks formed in time sequence on a storage medium comprising:

clock generating means for generating arrival time control clocks;

time stamp producing means for producing time stamps in synchronism with said arrival time control clocks for identifying arrival times of the packets to add the time stamps to the packets, respectively;

track forming means for forming tracks on the storage medium in time sequence in response to reference control signals provided in synchronism with said arrival time control clocks and in synchronism with respective changes in time stamp values; and recording means for recording the packets to which said time stamps are added on the storage medium in order of arrivals of the packets so that each of the packets is recorded within a given area ranging from a reference position defined on one of the tracks corresponding to an arrival time of each of the tracks to a given position away from the reference position at a preselected distance toward the following track.

8. A packet recording apparatus as set forth in claim 7, wherein said reference position is a record-starting position defined on the one of the tracks.

9. A packet recording apparatus for recording packets on tracks formed in time sequence on a storage medium comprising:

clock generating means for generating arrival time control clocks;

time stamp producing means for producing time stamps in synchronism with said arrival time control clocks for identifying arrival times of the packets to add the time stamps to the packets, respectively;

track forming means for forming tracks on the storage medium in time sequence in response to reference control signals provided in synchronism with said arrival time control clocks and in synchronism with respective changes in time stamp values; and recording means for recording the packets to which said time stamps are added on the storage medium in order of arrivals of the packets so that each of the packets is recorded within a given area ranging from a first position to a second position across a reference position, the reference position being defined on one of the tracks corresponding to an arrival time of each of the packets, the first and second positions being defined away from the reference position at preselected distances toward the tracks preceding and following the one of the tracks, respectively.

10. A packet recording/reproducing apparatus comprising:

recording means for recording tracks, in time sequence, on a first magnetic tape helically wrapped about a given area of a rotary drum using rotary heads disposed in the rotary drum to record input packets on the tracks in order of arrival of the input packets;

reproducing means for reproducing tracks formed in time sequence on a second magnetic tape to reproduce packets recorded on the tracks of the second magnetic tape through the rotary heads of the rotary drum;

clock generating means for generating arrival time control clocks;

first speed control means for controlling the speed of the rotary drum so as to synchronize with the arrival time control clocks every six of tracks;

time stamp producing means for producing time stamps in synchronism with said arrival time control clocks to add the time stamps to the packets to be recorded on the first magnetic tape, respectively;

record controlling means for controlling said recording means so that each of the packets is recorded within a one-track area, a two-track area, or a one-track over area, the one-track area ranging from a reference position defined on one of the tracks corresponding to an arrival time of each of the tracks to a given position away from the reference position at a given interval toward the following track, the two-track area ranging from a first position to a second position which are defined away from the reference position at preselected distances toward the tracks preceding and following said one of the tracks, respectively, the one-track over area ranging from a record-starting position on said one of the tracks to a predetermined position away from the record-starting position at a preselected interval toward the following tracks;

clock generating means for generating clocks having a given frequency;

second speed control means for controlling the speeds of the rotary drum and the second magnetic tape at six-track intervals based on signals reproduced from the second magnetic tape and said clocks generated by said clock generating means;

output control clock generating means for generating output control clocks after a delay of given time from said clocks generated by said clock generating means, respectively;

comparing means comparing a vale changed in synchronism with said output control clocks with one of the time stamps reproduced from the second magnetic tape to provide a signal when said value coincides with said one of the time stamps;

outputting means for outputting one of the packets to which said one of the time stamp is added; and time stamp removing means for removing the time stamp from said one of the packets outputted from said outputting means.

11. A packet recording/reproducing apparatus comprising:

recording means for recording tracks, in time sequence, on a first magnetic tape helically wrapped about a given area of a rotary drum using rotary heads disposed in the rotary drum to record input packets on the tracks in order of arrival of the input packets;

reproducing means for reproducing tracks formed in time sequence on a second magnetic tape to reproduce packets recorded on the tracks of the second magnetic tape through the rotary heads of the rotary drum;

clock generating means for generating arrival time control clocks which are synchronous with values of time stamps added to the packets to be recorded on the first magnetic tape;

first speed control means for controlling the speed of the rotary drum so as to synchronize with the arrival time control clocks every six of tracks;

record controlling means for controlling said recording means so that each of the packets is recorded within a one-track area, a two-track area, or a one-track over area, the one-track area ranging from a reference position defined on one of the tracks corresponding to an arrival time of each of the packets to a given position away from the reference position at a given interval toward the following track, the two-track area ranging from a first position to a second position which are defined away from the reference position at preselected distances toward the tracks preceding and following said one of the tracks, respectively, the one-track over area ranging from a record-starting position on said one of the tracks to a predetermined position away from the record-starting position at a preselected interval toward the following tracks;

clock generating means for generating clocks having a given frequency;

second speed control means for controlling the speeds of the rotary drum and the second magnetic tape at six-track intervals based on signals reproduced from the second magnetic tape and said clocks generated by said clock generating means;

output control clock generating means for generating output control clocks after a delay of given time from said clocks generated by said clock generating means, respectively;

comparing means comparing a value changed in synchronism with said output control clocks with one of the time stamps reproduced from the second magnetic tape to provide a signal when said value coincides with said one of the time stamps; and outputting means for outputting one of the packets to which said one of the time stamp is added.

12. In a storage medium on which tracks are formed in time sequence in synchronism with changes in value of time stamps for packet arrival time identification added to packets recorded on the storage medium, each of the packets being recorded within a one-track area, a two-track area, or a one-track over area, the one-track area ranging from a reference position defined on one of the tracks corresponding to an arrival time of each of the packets to a given position away from the reference position at a given interval toward the following track, the two-track area ranging from a first position to a second position which are defined away from the reference position at preselected distances toward the tracks preceding and following said one of the tracks, respectively, the one-track over area ranging from a record-starting position on said one of the tracks to a predetermined position away from the record-starting position toward the following tracks at a preselected interval which is greater than a width of each of the tracks.

13. A packet recording apparatus for recording input digital signals multiplexing packets of information on at least one program and a time control packet including a program clock reference on the program, comprising:

time stamp producing means for producing time stamps having values which indicate times of arrivals of the packets and adding the time stamps to the packets;

extracting means for extracting the program clock reference from the digital signals;

clock generating means for generating clocks which are synchronous with input of the program clock reference extracted by said extracting means;

reference control signal generating means for generating reference control signals in synchronism with the clocks generated by said clock generating means; and recording means for recording tracks on a storage medium in time sequence in response to the reference control signals generated by said reference control signal generating means and in synchronism with changes in time stamp, and for recording each said digital signals on one of the tracks.

14. A packet recording apparatus as set forth in claim 13, wherein said recording means forms tracks on the storage medium in sequence based on the reference control signals for recording thereon the digital signals.

15. A packet recording apparatus as set forth in claim 13, wherein identification information serving to identify the time control packet is multiplexed by the input distal signals and is formed with a time control information identification flag which is added to a header of the time control packet.

16. A packet recording apparatus as set forth in claim 13, wherein identification information serving to identify the time control packet is multiplexed by the input digital signals and includes a packet identifying number for identifying the time control packet.

17. A packet recording apparatus as set forth in claim 13, wherein the digital signals multiplex identification information serving to identify the time control packet and are formed with transport packets of MPEG2.

* * * * *